(12) United States Patent
Sekiyama et al.

(10) Patent No.: US 6,912,044 B2
(45) Date of Patent: Jun. 28, 2005

(54) SHEET POST-PROCESSING DEVICE AND IMAGE FORMING APPARATUS HAVING THE DEVICE

(75) Inventors: Junichi Sekiyama, Shizuoka (JP); Takashi Kuwata, Shizuoka (JP); Kenichiro Isobe, Shizuoka (JP); Masayoshi Fukatsu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/684,468

(22) Filed: Oct. 15, 2003

(65) Prior Publication Data

US 2004/0080739 A1 Apr. 29, 2004

(30) Foreign Application Priority Data

Oct. 28, 2002 (JP) .......................................... 2002-313319

(51) Int. Cl.⁷ .......................... G03B 27/00; G03B 27/52
(52) U.S. Cl. .......................................... 355/407; 355/40
(58) Field of Search .................... 355/27, 40, 405–107; 399/110, 410; 270/58.08–58.12

(56) References Cited

U.S. PATENT DOCUMENTS

| | | | |
|---|---|---|---|
| 5,765,826 A | 6/1998 | Isoda et al. .................. 271/162 |
| 6,302,606 B1 | 10/2001 | Hayakawa et al. .......... 400/625 |
| 6,318,718 B1 | 11/2001 | Ogata et al. .................. 271/213 |
| 6,325,371 B1 | 12/2001 | Araki et al. .................. 271/297 |
| 6,382,616 B1 | 5/2002 | Waragai et al. ........... 270/58.12 |
| 6,406,013 B1 * | 6/2002 | Nanba et al. .............. 270/58.11 |
| 6,412,774 B1 * | 7/2002 | Saito et al. .................. 271/220 |
| 6,643,480 B2 * | 11/2003 | Kuwata et al. ............. 399/107 |
| 6,661,995 B2 * | 12/2003 | Isobe et al. ................. 399/410 |
| 2003/0044209 A1 | 3/2003 | Isobe et al. ................. 399/410 |

* cited by examiner

*Primary Examiner*—Henry Hung Nguyen
(74) *Attorney, Agent, or Firm*—Fitzpatrick, Cella, Harper & Scinto

(57) ABSTRACT

Disclosed is a sheet post-processing device, including: a downstream side intermediate stacking unit having a pair of slide guides for supporting left and right edges of the sheet that is sent, the slide guides moving toward and away from each other so that the sheet is pressed against one of the slide guides that serves as a reference by the other slide guide to be positioned; a processing unit for processing the sheet positioned by the downstream side intermediate stacking unit; and a stacking unit for receiving the sheet that is dropped through a gap created between the slide guides, in which the pair of slide guides each have a bottom piece for supporting the edge of the sheet, and in which the bottom piece of the other slide guide is partially cut off to provide a remaining portion, the remaining portion making the gap between the bottom pieces wider on the upstream side than on the downstream side in the sheet conveying direction.

11 Claims, 19 Drawing Sheets

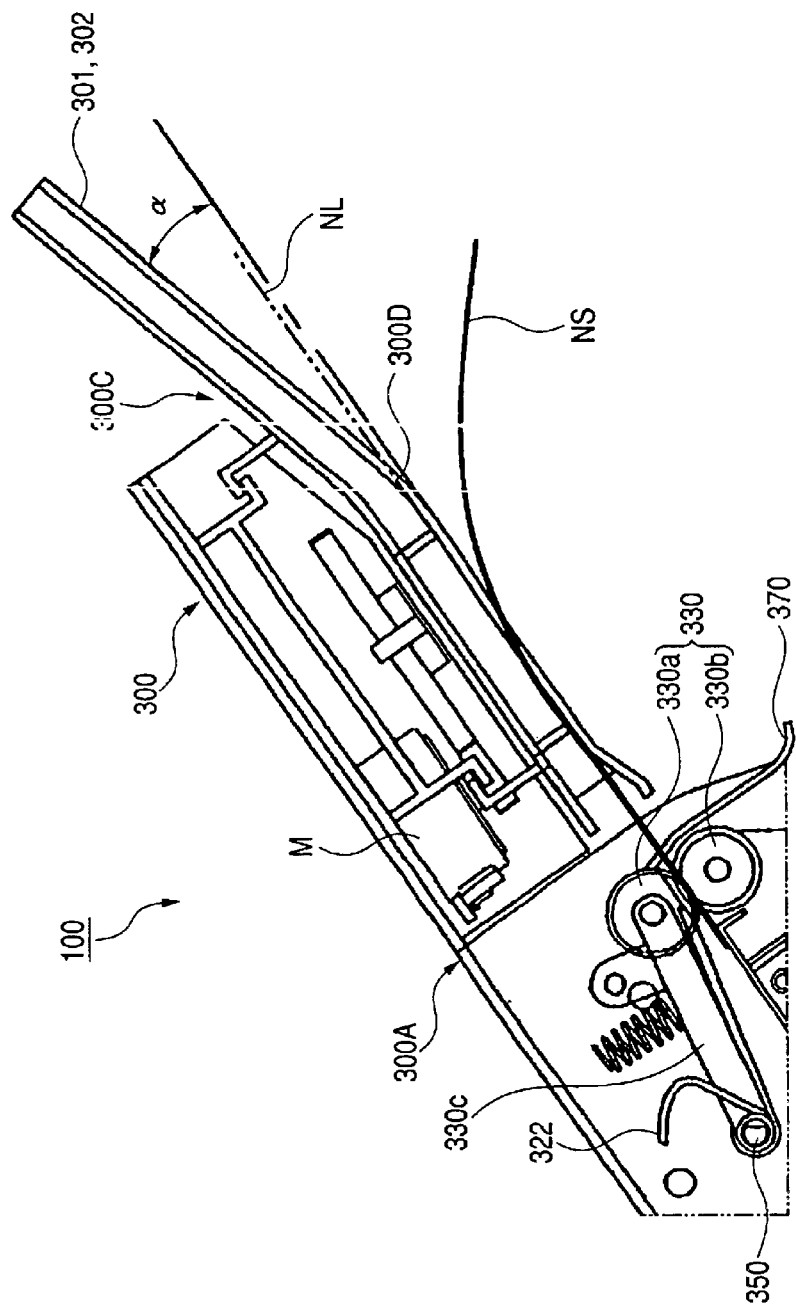

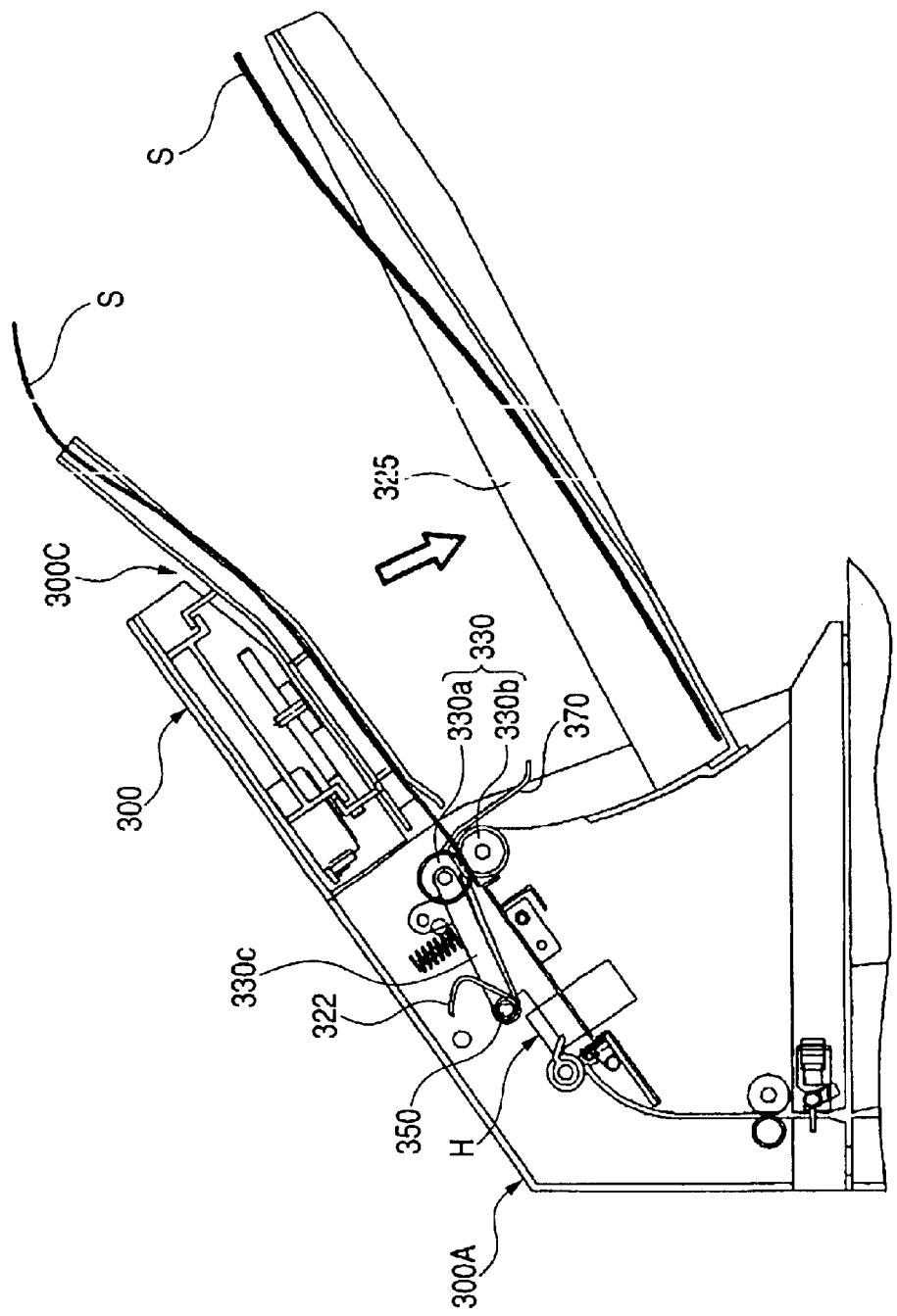

The present invention relates to a sheet post-processing device which is enhanced in sheet processing efficiency by preventing a support member from making an excess motion, specifically, a sheet post-processing device in which a pair of support members for supporting a sheet to be processed and putting the sheet to one side where the sheet is to be processed travel only a short distance to a sheet releasing position where the processed sheet is to be released. The present invention also relates to an image forming apparatus having this sheet post-processing device.

2. Related Background Art

Some of conventional image forming apparatuses for forming an image on a sheet, such as copying machines, printers, fax machines, and multifunction machines having these in combination, have sheet post-processing devices for processing a sheet on which an image has been formed. There are a variety of sheet post-processing devices including one for binding sheets and a punching device for punching a hole in a sheet.

Some of sheet post-processing devices are provided with intermediate stacking units and stacking trays. An intermediate stacking unit has slide guides which are a pair of support members movable in the direction orthogonal to the sheet conveying direction. Using the pair of slide guides, the intermediate stacking unit holds a sheet sent from the main body of an image forming apparatus by the sheet's side edges alone. A stacking tray is positioned below the intermediate stacking unit to catch a sheet, or a bundle of sheets, dropped from the intermediate stacking unit. To summarize, in a sheet post-processing device having an intermediate stacking unit and a stacking tray, a pair of slide guides receive sheets discharged from a sheet discharge port, align the sheets widthwise into a neat pile (so that the sheet edges along the sheet conveying direction are flush with one another), and position the stack of sheets in a binding process position to bind the sheets with a measure for binding a bundle of sheets, for example, a stapler. Thereafter, the sheet post-processing device opens the pair of slide guides to let the bundle of sheets drop onto the stacking tray. If the sheet post-processing device is a punching device, the pair of slide guides can punch a hole not only in a stack of sheets but also in a single sheet by approaching a sheet from the sides of the sheet to position the sheet at a given position.

When sheets are not to be bound, there is no need for the intermediate stacking unit to intercept sheets discharged from the discharge port and accordingly, the sheet post-processing device let sheets drop from the discharge port directly on the stacking tray by opening the pair of slide guides to a point where the slide guides do not in interfere with the falling sheets.

A low-cost type sheet post-processing device has a stapler fixed as well as one of slide guides that is on the stapler side while the other slide guide is moved alone. Accordingly, in a low-cost type sheet post-processing device, sheets are discharged and delivered to a pair of slide guides of an intermediate stacking unit, the stapler side slide guide is used as the reference in moving the other slide guide to push the sheets against the reference slide guide, to thereby align and position the stack of sheets. Thereafter, the sheet post-processing device uses the stapler to bind the stack of sheets and moves the other slide guide to a retraction position. As a result, the bundle of sheets drops through a gap between the opened slide guides onto a stacking tray.

However, in such conventional sheet post-processing device, sheets delivered without receiving post processing (hereinafter each of these sheets is referred to as single sheet) and sheets delivered after receiving post processing are stacked at different positions in the sheet width direction on the stacking tray. The difference in stacking position upon delivery is caused by the fact that a sheet delivered without receiving post processing is discharged from the main body of an image forming apparatus, centered side-to-side on a conveying path, onto the stacking tray whereas a sheet to be delivered after receiving post processing is discharged from the main body of the image forming apparatus, moved for aligning and positioning in the width direction to the stapler side slide guide, which serves as the reference, to be delivered to the stacking tray in a different position from when the sheet has left the main body of the image forming apparatus.

As described, a sheet delivered without receiving post processing and a sheet delivered after receiving post processing are different from each other in delivery position in the sheet width direction. Therefore, the slide guide has to make an excess motion to let processed sheets drop onto the stacking tray.

To elaborate, a sheet to be delivered without receiving post processing is delivered at the position indicated by the solid line in FIG. 20 whereas a sheet to be delivered after receiving post processing is delivered at the position indicated by the broken line. The left side slide guide is therefore designed to move to a position that does not interfere with a sheet delivered at the position indicated by the solid line. Even when a sheet is delivered at the position indicated by the broken line, the left side slide guide moves to the set position.

A portion denoted by reference numeral 340 in FIG. 20 is a sheet holding portion according to an embodiment of the present invention. The sheet holding portion 340 is shown for ease of comparison between prior art and the embodiment of the present invention. A sheet is delivered downward from an upper part of the drawing.

As described above, in this type of conventional sheet post-processing device, the unnecessary motion of the slide guide leads to poor sheet processing efficiency.

Furthermore, an image forming apparatus having this type of sheet post-processing device is low in image forming efficiency since an image is formed on a sheet at a rate dictated by the sheet processing efficiency of the sheet post-processing device.

SUMMARY OF THE INVENTION

An object of the present invention is to provide a sheet post-processing device which is enhanced in sheet processing efficiency by preventing a support member from making an excess motion.

Another object of the present invention is to provide an image forming apparatus which has the above sheet post-processing device to enhance the image forming efficiency.

In order to attain the above-mentioned objects, a sheet post-processing device according to the present invention includes:

conveying means for conveying a sheet;

intermediate stacking means having a pair of support members for supporting left and right edges of the sheet that is sent from the conveying means, the support members capable of moving toward and away from each other in a direction that intersects a sheet conveying direction so that the sheet is pressed against one of the support members that serves as a reference by the other support member to be positioned;

processing means for processing the sheet positioned by the intermediate stacking means; and delivery and stacking means for receiving the sheet that is dropped through a gap created between the pair of support members which are moved away from each other, in which the gap between the pair of support members in the direction that intersects the sheet conveying direction is narrower on a downstream side in the sheet conveying direction than on an upstream side in the sheet conveying direction when the support members are retracted apart from each other.

In order to attain the above-mentioned objects, in the sheet post-processing device of the present invention, the pair of support members each have a support portion for supporting the edge of the sheet, the support portion of the other support member being partially cut off on the upstream side in the sheet conveying direction to provide a remaining portion, and the remaining portion of the other support member making the gap between the support members in the direction that intersects the sheet conveying direction narrower on the downstream side in the sheet conveying direction when the support members are retracted.

In order to attain the above-mentioned objects, in the sheet post-processing device of the present invention, when the pair of support members are retracted, the other support member is tilted with respect to the one support member to narrow the gap between the support members in the direction that intersects the sheet conveying direction on the downstream side in the sheet conveying direction.

In order to attain the above-mentioned objects, in the sheet post-processing device of the present invention, when the pair of support members are retracted, the difference in the gap between the support portions of the pair of support members, on the downstream side and the upstream side in the sheet conveying direction, is set approximately equal to a distance that the sheet conveyed from the conveying means travels to reach the one support member that serves as the reference.

In order to attain the above-mentioned objects, in the sheet post-processing device of the present invention, the remaining portion is provided in the other support member in a manner that allows the remaining portion to move toward and away from the one support member.

In order to attain the above-mentioned objects, in the sheet post-processing device of the present invention, the remaining portion has a triangular shape.

In order to attain the above-mentioned objects, in the sheet post-processing device of the present invention, the remaining portion is moved in accordance with the size of the sheet conveyed from the conveying means.

In order to attain the above-mentioned objects, in the sheet post-processing device of the present invention, the pair of support members position the sheet by making parallel motions to approach each other.

In order to attain the above-mentioned objects, in the sheet post-processing device of the present invention, down-stream side ends in the sheet conveying direction of the pair of support members are on a higher plane than upstream side ends of the support members.

In order to attain the above-mentioned objects, in the sheet post-processing device of the present invention, the pair of support members are bent in the middle in the sheet conveying direction in a manner that puts the downstream side ends of the support members on a higher plane than the upstream side ends of the support members.

In order to attain the above-mentioned objects, an image forming apparatus according to the present invention includes:

image forming means for forming an image on a sheet; and a sheet post-processing device according to any one of the descriptions made above which discharges the sheet on which the image is formed by the image forming means.

In the sheet post-processing device of the present invention, the gap between the support portions is wider on the upstream side in the sheet conveying direction than on the downstream side. Accordingly, the distance the other support member has to travel to widen the gap in delivering a processed sheet (or a bundle of processed sheets) is shorter than in prior art and the excess motion of the support member is reduced that much, thereby enhancing the sheet post-processing efficiency. The pair of support members need to move less than in prior art to deliver a sheet that does not receive post processing. By reducing the amount of movement of the support members, the sheet delivery time can be shortened to raise the sheet delivery efficiency. Reduction in amount of movement of the support members also enables reduction in the size of the device. In addition, the support members leave the left and right edges of a sheet (of a bundle of sheets) approximately at the same time, so that the sheet (or the bundle of sheets) drops flatly to be stacked on the same position. This means that sheets can be stacked neatly on the delivery and stacking means.

In the sheet post-processing device of the present invention, the gap between the support portions is narrower on the downstream side in the sheet conveying direction than on the upstream side after the pair of support members are retracted outward. Accordingly, even when a sheet is to be delivered without being pushed to one side for alignment, dropping the sheet on the delivery and stacking means can be achieved by retracting the other support member only as far as it does when a sheet is to be aligned before delivery with one side as the reference. The amount of retraction of the pair of support members is thus reduced. Furthermore, the retraction amount can be cut down by a length twice the distance between a processed sheet and a sheet that receives no post processing, enabling reduction in the size of the sheet post-processing device.

In the sheet post-processing device of the present invention, the pair of support members are bent in the middle in the sheet conveying direction so that the downstream ends are put on a higher plane than the upstream ends. Accordingly, if the width of the gap between the pair of support members which is orthogonal to the sheet conveying direction is narrower on the downstream side in the sheet conveying direction than on the upstream side past the bending point when the support members are retracted outward, and if a sheet conveyed by conveying means at a sheet conveying angle (e.g., nip angle) has low rigidity, the leading end of the sheet droops due to its own weight. On the other hand, when a sheet having high rigidity is conveyed at the sheet conveying angle and delivered maintaining the conveying angle, and when the sheet is to receive no post processing, the sheet can pass under the remaining portion or the tilted portion even though the delivery position of the sheet that receives no post processing seems to overlap the remaining portion or the tilted portion in bird's-eye view, as long as the gap is narrow between portions of the pair of support members that are bent upward beyond the conveying angle. Accordingly, there is no fear of catching the sheet that receives no post processing on the support members. This prevents the pair of support members from being opened wider than necessary, enabling reduction in the size of the device and enhancement of the sheet processing efficiency.

In the sheet post-processing device of the present invention, the position of the remaining portion is changed in accordance with the sheet size so that the gap between the one support member and a sheet is set almost equal to the gap between the remaining portion of the other support member and the sheet. This makes it possible to let a sheet (or a bundle of sheets) drop in the same manner irrespective of the sheet size, thus forming a neat stack on the delivery and stacking means.

BRIEF DESCRIPTION OF THE DRAWINGS

FIG. 8 is a diagram illustrating a bent state of the slide guides in the sheet post-processing device of Embodiment 1;

FIG. 11 is a diagram showing a sheet falling from the downstream side intermediate stacking unit to be stacked on a sheet stacking unit in the sheet post-processing device of Embodiment 1;

DESCRIPTION OF THE PREFERRED EMBODIMENTS

Given below with reference to the drawings are descriptions of sheet post-processing devices according to embodiments of the present invention.

The sheet post-processing devices are incorporated in laser beam printers as an example of an image forming apparatus. Other examples of an image forming apparatus than laser beam printers include copying machines, fax machines, and complex machines etc. having these in combination, and the sheet post-processing devices according to the embodiments of the present invention can also be incorporated in those image forming apparatuses. Thus, the apparatus in which the sheet post-processing devices according to the embodiments of the present invention are incorporated is not limited to laser beam printers.

The sizes, materials, and shapes of structural components given in the following embodiments, as well as arrangement of the components in relation to one another, should be modified to suit the structure of an apparatus to which the present invention is applied or to accommodate various conditions. The scope of the present invention is not limited to those given in the embodiments unless there is a specific statement to the contrary.

Embodiment 1

Figure 1:
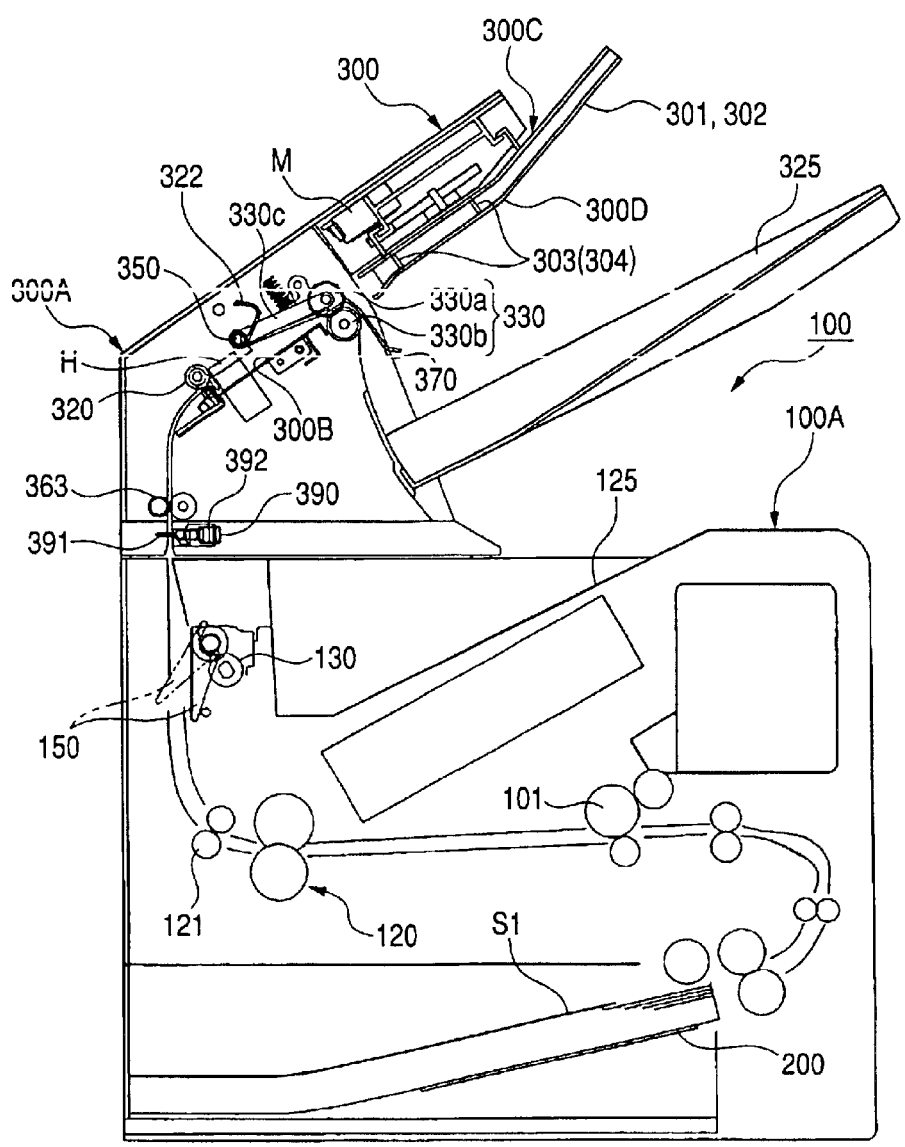
FIG. 1 is a sectional view outlining the overall structure of a laser beam printer as an example of an image forming apparatus that has in its main body a sheet post-processing device according to Embodiment 1 of the present invention.
Figure 2:
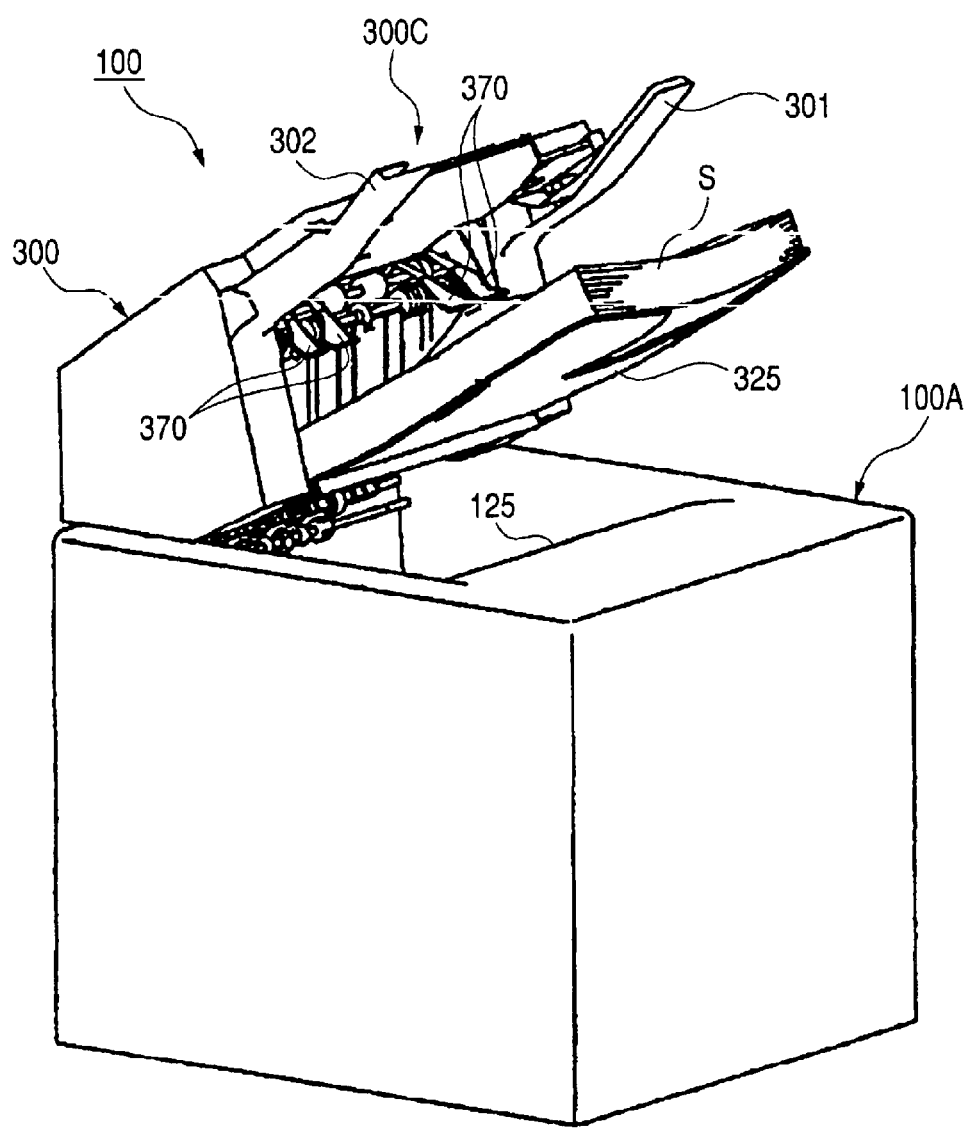
FIG. 2 is a perspective view showing the exterior of the laser beam printer of FIG. 1.

FIG. 1 is a schematic sectional view showing an overall structure of a laser beam printer as an example of an image forming apparatus that has in its main body a sheet post-processing device according to Embodiment 1 of the present invention. FIG. 2 is a perspective view showing an exterior of the laser beam printer of FIG. 1.

(Overall Structure of the Image Forming Apparatus)

The laser beam printer (hereinafter simply referred to as printer) shown in FIGS. 1 and 2 as an example of an image forming apparatus is denoted by 100. The printer 100 is connected by itself to a computer or a network such as LAN, forms an image (prints letters) on a sheet through a given image forming process from image information, print signals, or the like sent from the computer or the network, and then discharges the sheet.

A laser beam printer main body, the main body of the printer 100, is denoted by 100A (hereinafter simply referred to as printer main body). A sheet post-processing device 300 is placed on top of the printer main body 100A. Sheets from the printer main body 100A are sent to a convey unit inside the sheet post-processing device 300. Through the convey unit, the sheets are conveyed face down (with formed images facing downward) to an upstream side intermediate stacking unit 300B and then to a downstream side intermediate stacking unit 300C (slide guides 301 and 302 described later) to be stacked. With an alignment function of the downstream side intermediate stacking unit 300C which is described later, the sheets are aligned and bundled for each given job. The bundle of sheets is bound at one or more points before delivered onto delivery and stacking means, for example, a sheet stacking unit 325 to be stacked. The sheet post-processing device 300 is also capable of simply delivering and stacking sheets face down onto the sheet stacking unit 325 without binding the sheets.

The sheet post-processing device 300 and the printer main body 100A are electrically connected to each other through a not-shown cable connector. The sheet post-processing device 300 has its structural components housed in a casing 300A, which makes the sheet post-processing device 300 detachable from the printer main body 100A.

(Structure of the Printer Main Body)

A structure of components of the printer main body 100A is described following a sheet S conveying path.

In the printer main body 100A, plural sheets S, S, S, . . . are stacked in a feed cassette 200 and are fed one by one by various rollers starting from the topmost sheet. Upon receiving a given print signal supplied from the computer or the network, the printer first feeds a sheet S from the feed cassette 200 to image forming means for forming a toner image through a laser beam type image forming process, for example, a photosensitive drum 101, to print a toner image on the top face of the sheet S. Subsequently, the sheet S is heated and pressurized in a fixing unit 120 on the downstream side to fix the toner image permanently. The sheet S having the image fixed arrives at the halfway point of the substantially U-shaped conveying path, which extends to a delivery roller 130, and is turned upside down so that the side having the image formed faces downward. The sheet S is then delivered face down to a face down discharge unit 125, which is provided in an upper part of the printer main body 100A.

To where the sheet S is to be discharged is determined in accordance with the position of a flapper 150 of the printer main body 100A which is rotated based on a control signal sent from a not-shown control unit. For instance, the sheet S is discharged by the delivery roller 130 to the face down (FD) discharge unit 125 or to the sheet stacking unit 325 of the sheet post-processing device 300.

(Structure of the Sheet Post-processing Device)

A structure of the sheet post-processing device 300 is explained with reference to FIGS. 1, 2, 3, 4, 5A and 5B.

Convey means, for example, a delivery roller pair 330 composed of an upper delivery roller 330a and a lower delivery roller 330b is placed above and downstream in the sheet conveying direction of the flapper 150. The delivery roller pair 300 is rotated by a not-shown drive motor. The upper delivery roller 330a is axially supported by an arm 330c, which can rotate about a paddle shaft 350. A jogger motor M is a driving source to move the slide guides 301 and 302 described later and, in this embodiment, is a stepping motor.

Figure 5A:
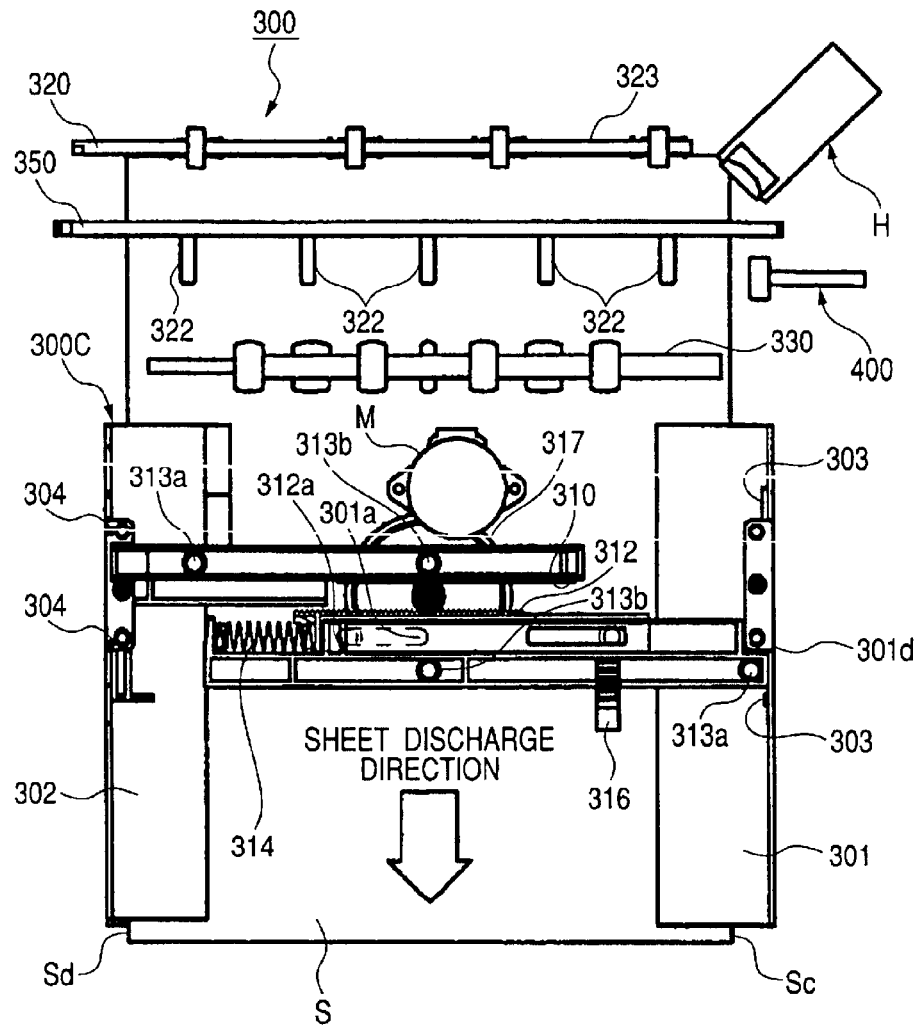
FIGS. 5A and 5B are diagrams of the sheet post-processing device according to Embodiment 1, FIG. 5A showing a plan view of the sheet post-processing device, FIG. 5B showing FIG. 5A viewed from the near side.

Paddles 322 at an end portion in the sheet conveying direction are formed of rubber or other flexible material, and a plurality of them are fixed to the paddle shaft 350 in the direction orthogonal to the sheet conveying direction (see FIG. 5A). The paddles 322 are rotated clockwise by rotation of the paddle shaft 350 as a sheet is discharged from the printer main body 10A. The rotation of the paddles 322 sends the sheet S in the direction opposite to the sheet conveying direction and pushes the rear end (the sheet end portion on the upstream side in the conveying direction) of the sheet S against a reference wall 323, thereby aligning the sheet S. With the paddles 322 thus placed, a sheet can be aligned more precisely.

Figure 5B:
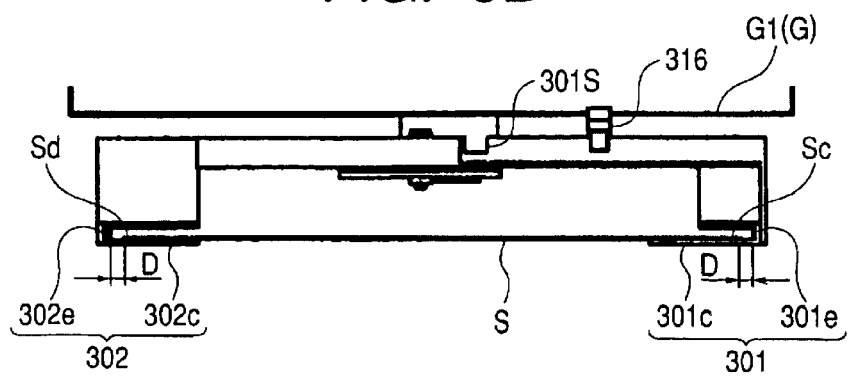

As shown in FIGS. 5A and 5B, the sheet post-processing device 300 of this embodiment has intermediate stacking means for aligning a sheet in the direction orthogonal to the sheet conveying direction (sheet width alignment), for example, the downstream side intermediate stacking unit 300C composed of the slide guide 301 and the slide guide 302. In FIGS. 5A and 5B, processing means in the sheet post-processing device of this embodiment, for example, a stapler H, is placed and fixed on the side of the slide guide 301 in order to bind sheets by stapling the sheets in the upper left corner of the image side of the sheets which was subjected to the image forming process. Although the stapler H looks like stapling sheets in the upper right corner in FIGS. 5A and 5B, the sheets shown in FIGS. 5A and 5B are stacked with the image side facing downward (face down) toward the slide guides 301 and 302, and therefore, when the sheets are flipped, the sheets are bound in the upper left corner of the image side of the sheets. The same applies to FIGS. 7A and 7B, 12A and 12B, and 14A and 14B through 19.

(Operations of the Sheet Post-processing Device)

<Sheet Loading Operation>

Referring to FIGS. 3, 4, 5A and 5B, a description is given on how the components operate when the sheet S conveyed from the printer main body 100A heads towards the sheet post-processing device 300.

The sheet post-processing device 300 performs a stapling process (a process for binding sheets) based on a command that is outputted from the computer or the like in advance. To carry out the stapling process, first, a not-shown solenoid makes the flapper 150 rotate counterclockwise in FIG. 1 to switch the conveying path to the sheet post-processing device side before a sheet S to be stapled is discharged from the printer main body 100A by a conveying roller 121 (see FIG. 1) provided in the printer main body 100A.

This causes the conveying roller 121 to load the sheet S into the sheet post-processing device 300. The sheet S loaded into the sheet post-processing device 300 is detected as the sheet S turns a flag 391 of an entrance sensor 390 clockwise and the turned flag 391 lets light transmit through a photo sensor 392. Thereafter, the sheet S is conveyed upward by an entrance roller pair 363.

<Sheet Delivery and Stacking Operation>

The sheet post-processing device 300 of this embodiment is capable of binding sheets and delivering the bound sheets to the sheet stacking unit 325 to be stacked as well as simply delivering sheets face down and stacking the sheets on the sheet stacking unit 325. Delivery and stacking operations for the respective cases are described below.

(Facedown Delivery and Stacking)

Figure 7A:
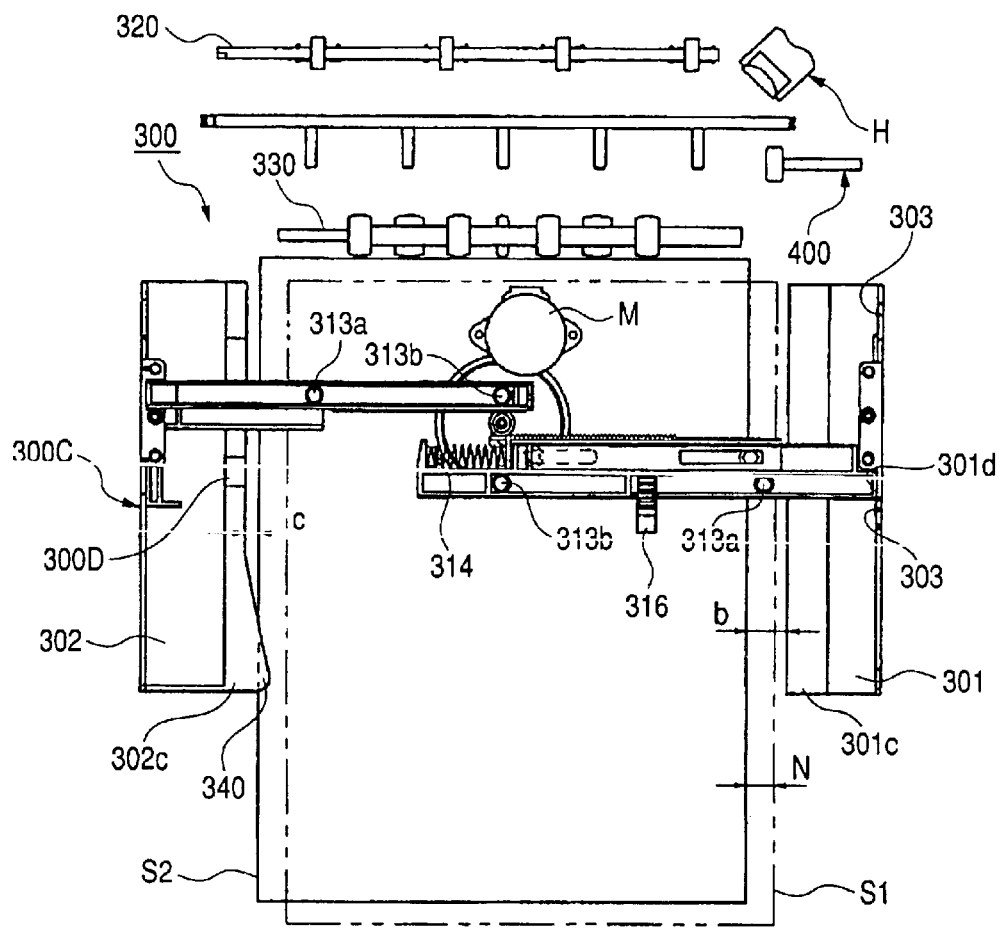
FIGS. 7A and 7B are diagrams showing how a processed sheet is delivered and how a sheet that does not receive processing is delivered in the sheet post-processing device of Embodiment 1, FIG. 7A showing a plan view of the sheet post-processing device, FIG. 7B showing FIG. 7A viewed from the near side.
Figure 7B:
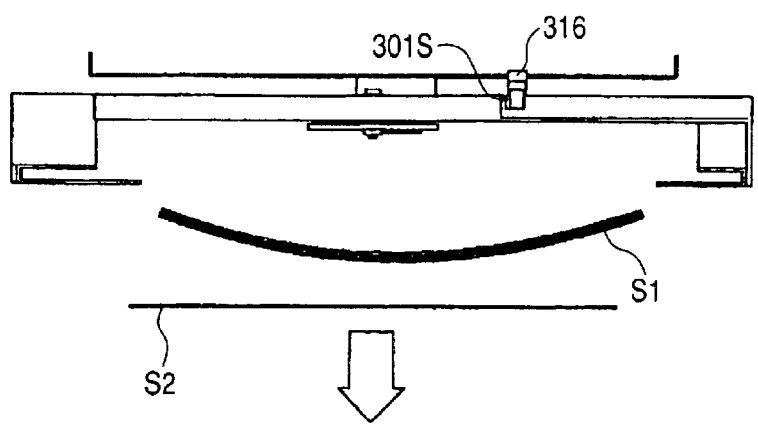

Described first with reference to FIGS. 7A and 7B is an operation of delivering sheets face down and stacking the sheets on the sheet stacking unit 325.

In FIG. 7A, a bundle of sheets S1 is indicated by a broken line and a single sheet S2 is indicated by a solid line. The sheet bundle S1 to be bound is aligned with the slide guide 301 as the reference. On the other hand, the single sheet S2 is not aligned. This makes the sheet bundle S1 offset from the single sheet S2 by N.

The single sheet S2 is delivered as follows:

The slide guide 301, which is on the right side in the sheet loading direction, and the left side slide guide 302 are retracted as shown in FIG. 7A to positions where support portions of the slide guides, for example, bottom pieces 301c and 302c, do not come into contact with the single sheet S2 being loaded. In other words, the slide guides 301 and 302 are retracted to outside positions distanced by b and c, respectively, from the edges in the width direction of the single sheet S2.

Figure 9:
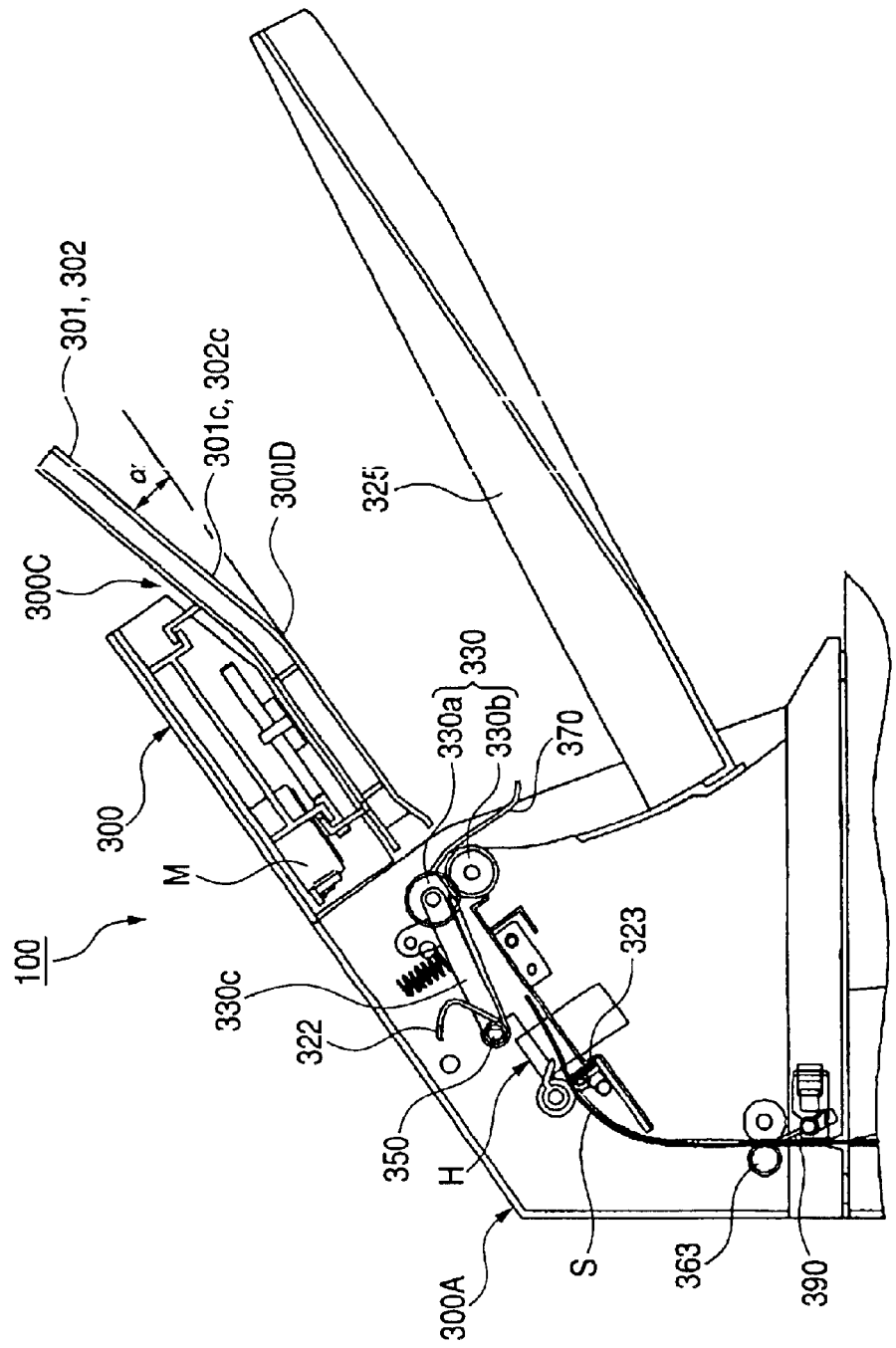
FIG. 9 is a diagram showing a state of the sheet post-processing device of Embodiment 1 upon arrival of the leading end of a sheet at an upstream side intermediate stacking unit.

In FIG. 7A, which is a plan view, a remaining portion protruding from the slide guide 302 to form a triangular shape, for example, a sheet holding portion 340, seems to interfere with the single sheet S2. Actually, the slide guide 302 is bent at an angle α as shown in FIGS. 8 and 9, creating a level difference between the single sheet S2 and the slide guide 302 and thereby avoiding interference. To elaborate, a nip angle of the delivery roller pair 330 can be extended along a line denoted by reference symbol NL as shown in FIG. 8 whereas a delivery track of the single sheet S2 runs along a line indicated by reference symbol NS. The sheet holding portion 340 (see FIG. 7A) is placed past a point where the slide guide 302 is bent at the angle α to extend above the convey nip line NL as shown in FIGS. 8 and 9. The sheet holding portion 340 is thus prevented from interfering with the single sheet S2 as the single sheet S2 is discharged.

Figure 3:
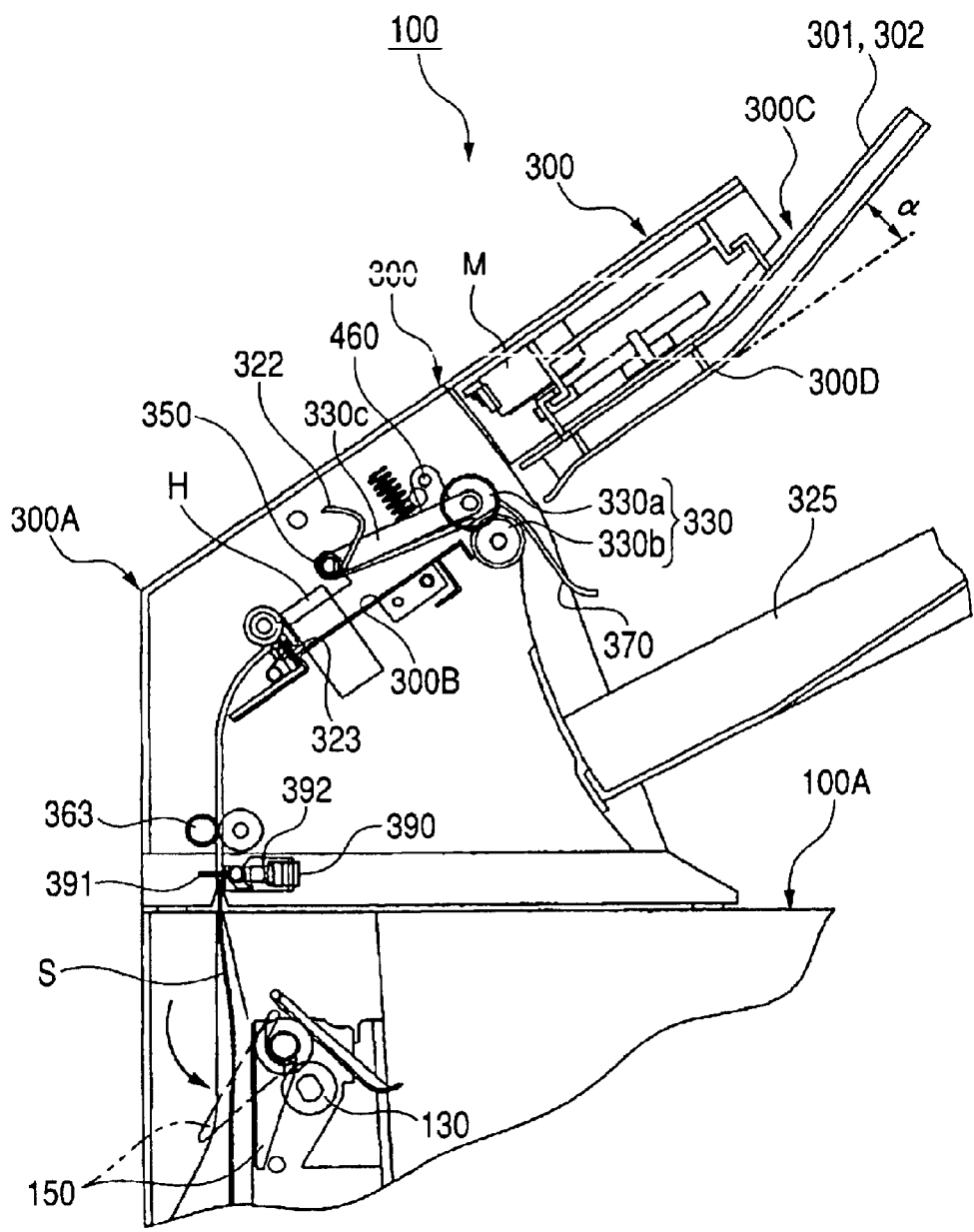
FIG. 3 is a diagram showing a state of each component of a sheet post-processing device when a sheet is sent from the main body of the image forming apparatus to the sheet post-processing device.
Figure 4:
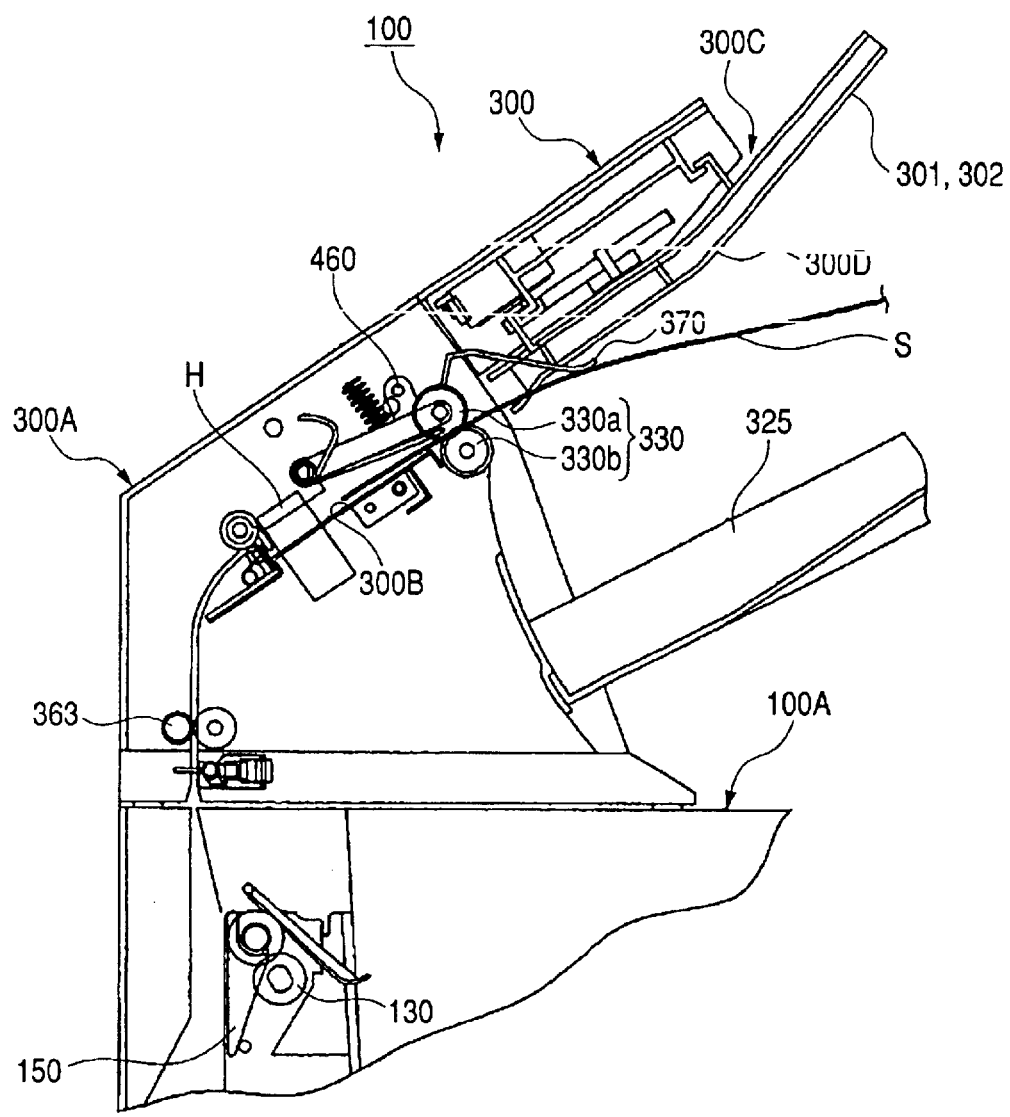
FIG. 4 is a diagram showing how a sheet that receives no post processing is delivered.

Accordingly, the single sheet S2 is conveyed by the entrance roller pair 363, passed through the gap between a staple roller pair 320 and the stapler H with the sheet kept in exactly the same position as when the sheet has been sent from the printer main body 100A shown in FIG. 1, and discharged by the delivery roller pair 330 without being moved in the sheet width direction by the slide guides 301 and 302. Then, the single sheet S2 drops in the direction indicated by an arrow of FIG. 7B to land on the sheet stacking unit 325 as shown in FIG. 4. At this point, the sheet S pushes up a full load detecting flag 370, which hangs down as shown in FIG. 3, and causes the flag 370 to rotate about a rotation center 460 as shown in FIG. 4.

(Delivery and Stacking after Stapling)

Described next is an operation of binding sheets and then delivering the bound sheets to the sheet stacking unit 325 to be stacked.

Figure 6A:
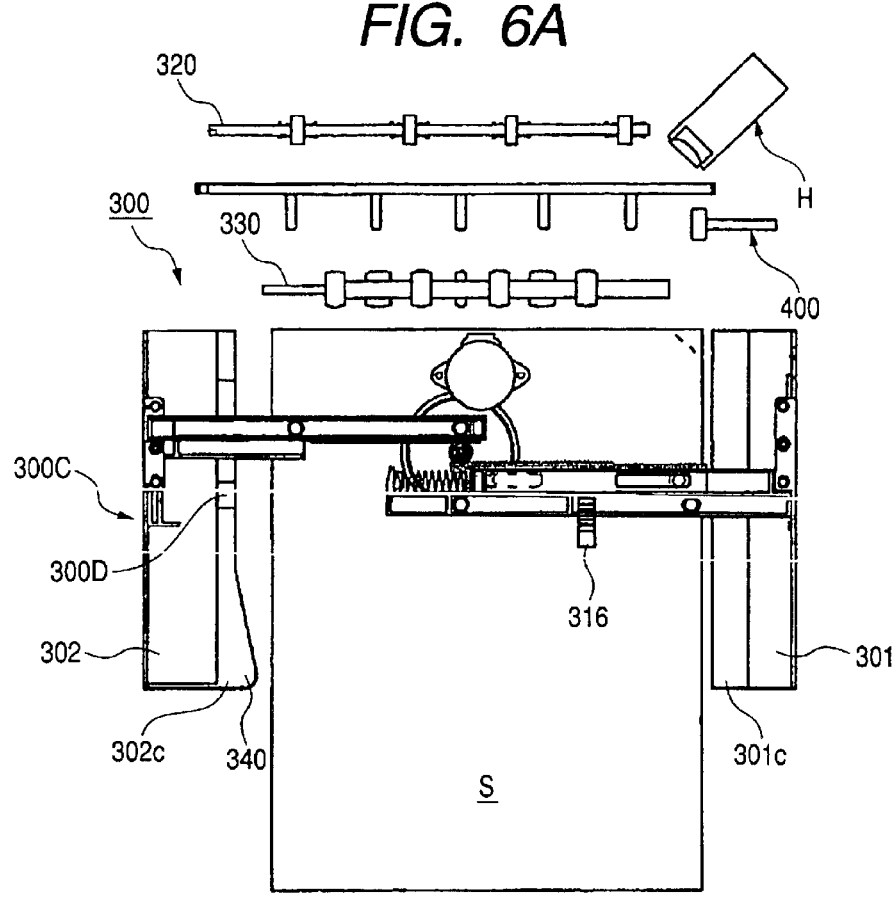
FIGS. 6A and 6B are diagrams of a bundle of sheets falling as slide guides are set in the home position in the sheet post-processing device of Embodiment 1, FIG. 6A showing a plan view of the sheet post-processing device, FIG. 6B showing FIG. 6A viewed from the near side.

As shown in FIG. 6A, the slide guides 301 and 302 move from the positions where the bottom piece 301c of the slide guide 301, which is on the right side in the loading direction, and the bottom piece 302c of the left side slide guide 302 do not interfere with a sheet S being loaded, in other words, from the outside positions at given distances from the sheet S in the width direction, to positions farther outside of the sheet S in the width direction. This is for preventing reference pins 303 and 304, which are provided on walls of the slide guides 301 and 302, respectively, from interfering with the sheet S being loaded as shown in FIGS. 5A and 5B.

Figure 10:
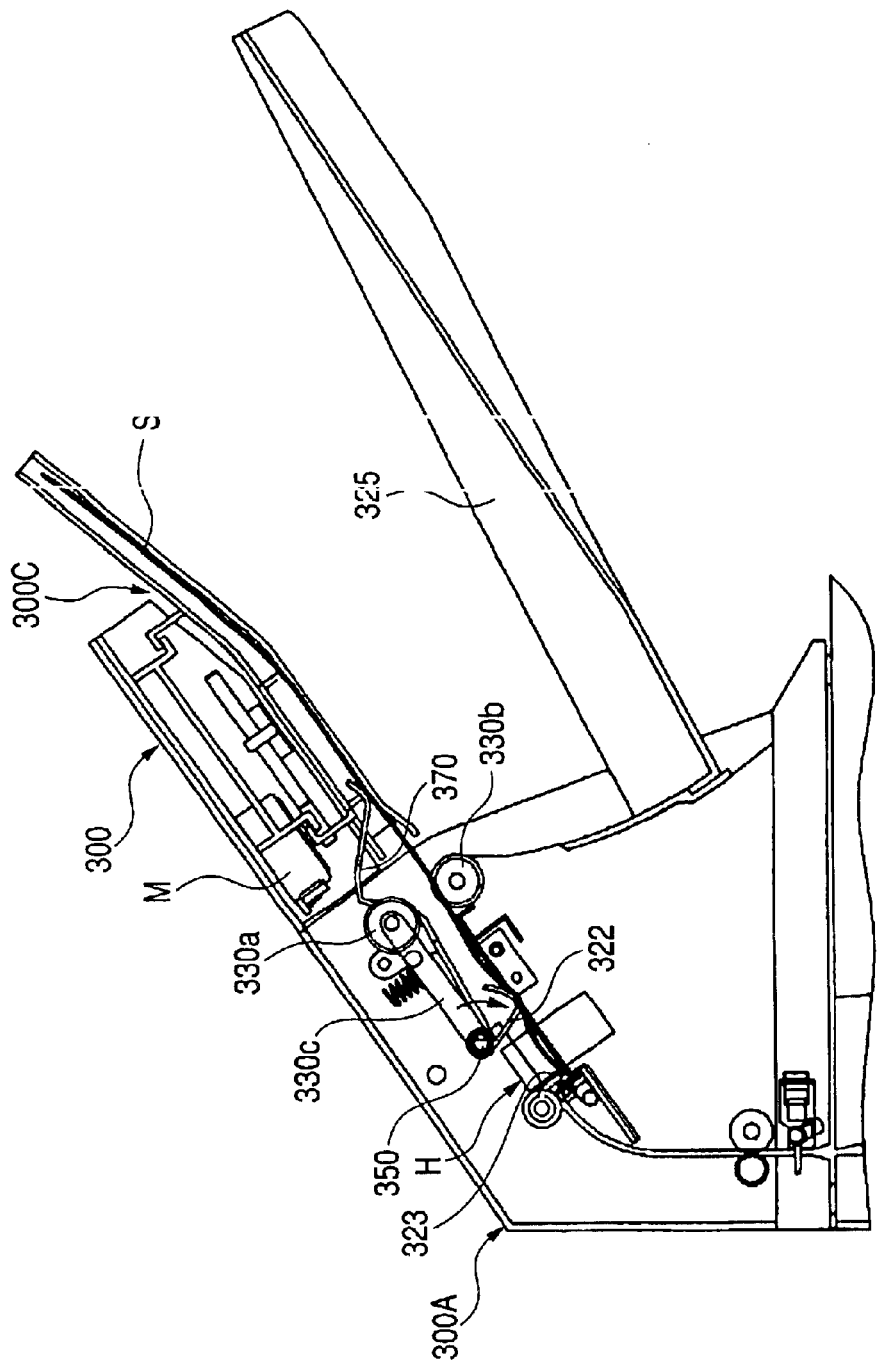
FIG. 10 is a diagram showing a state of the sheet post-processing device of Embodiment 1 upon arrival of a sheet at a downstream side intermediate stacking unit.

Before the slide guides 301 and 302 are moved, the arm 330c used as means to drive the full load detecting flag 370 is turned upward and a cam face of the arm 330c pushes up a cam face of the full load detecting flag 370, causing the full load detecting flag 370 to retreat to a position shown in FIG. 10.

In this state, the slide guides 301 and 302 move to assume the state shown in FIG. 5A. Then, with a rotating operation of the arm 330c, the full load detecting flag 370 enters a space between the slide guides 301 and 302. The arm 330c is then turned downward and reaches a position at which the upper delivery roller 330a of the delivery roller pair 330 comes into contact with the lower delivery roller 330b, in preparation for loading of a sheet. This is an initial operation for staple stacking.

At this point, a gap between the inner edges of the bottom pieces 301c and 302c of the two slide guides 301 and 302 is narrower than the width of the sheet S. Put in this standby position, the two slide guides 301 and 302 can support the advancing sheet S and constitute the downstream side intermediate stacking unit 300C.

Accordingly, a first sheet is conveyed by the entrance roller pair 363, passed through a gap between the staple roller pair 320 and the stapler H, and conveyed by the delivery roller pair 330 onto the bottom pieces 301c and 302c of the downstream side intermediate stacking unit 300C that is composed of the slide guides 301 and 302.

Although the arm 330c is used as means to drive the full load detecting flag 370 in this embodiment, the present invention is not limited thereto. For instance, dedicated driving means may be provided aside from the arm 330c.

As shown in FIG. 9, the bottom pieces 301c and 302c of the downstream side intermediate stacking unit 300C are inclined overall at a given angle with respect to a horizontal direction while there is a difference in angle of inclination of the bottom pieces between the upstream side and the downstream side in the sheet loading direction. Specifically, a given section on the upstream side of each bottom piece and a given section on the downstream side are defined from each other by a bent portion 300D, at which the bottom piece is bent at a bending angle a. Providing the bent portion 300D in each of the slide guides 301 and 302 gives the sheet S rigidity. This prevents the sheet S from sagging in the center area where the sheet S is not supported by the slide guides 301 and 302 and makes it possible to avoid such a situation that the center area of the sheet S sags between the slide guides 301 and 302 causing the sheet S to fall accidentally through the gap between the slide guides 301 and 302 when the slide guides are not opened to allow the sheet S to drop.

Immediately after the leading end portion, at the earliest, of the first sheet reaches a plane formed by the slide guides 301 and 302, the arm 330c is rotated counterclockwise as shown in FIG. 10. The rotation of the arm 330c causes the upper delivery roller 330a, which is axially supported by the arm 330c, to retract upward and put a distance from the lower delivery roller 330b of the delivery roller pair 330. A second sheet and sheets following the second sheet are delivered and stacked with the rollers of the delivery roller pair 330 spaced apart from each other in order to prevent a sheet that is being discharged from pushing out sheets that have previously been discharged and stacked.

(Structure of the Slide Guides)

A structure of the slide guides 301 and 302 is now described.

As shown in FIGS. 5A and 5B, the slide guides 301 and 302 are guided by guide pins 313a, which are provided in a mold frame G, and guide pins 313b, which are provided in a sheet metal frame G1, four pins in total, to make a reciprocating motion in the left-to-right direction of FIGS. 5A and 5B, in other words, the direction that is at right angles with the sheet conveying direction (width direction). The slide guides 301 and 302 are moved upon receiving a drive force from the jogger motor M.

When viewed from the downstream in the sheet conveying direction as shown in FIG. 5B, the slide guides 301 and 302 each form a shape resembling a shape of a letter C, from wall portions 301e and 302e, which guide the left and right sides of the sheet S, from the bottom pieces 301c and 302c, which support the bottom face of the sheet S, and from other parts. The slide guides 301 and 302 use the bottom pieces 301c and 302c that constitute the letter C shape to support the left and right edges of each sheet that is delivered to the upstream side intermediate stacking unit 300B to be loaded in the downstream side intermediate stacking unit 300C. On the other hand, the center area in the width direction of the sheet S is neither guided nor supported by the slide guides 301 and 302.

The slide guide 302 is provided with a slide rack 310, which meshes with a stepped gear 317. The stepped gear 317 also meshes with a slide rack 312, which is provided in the slide guide 301.

The slide rack 312 is movable relative to the slide guide 301 through a coil spring 314. The spring 314 biases the slide guide 301 and the slide rack 312 in a manner that widens a gap between the left edge of the slide guide 301 and the left edge of the slid rack 312 by pressing one end against the slide guide 301 and the other end against the slide rack 312. The slide rack 312 has an embossing portion 312a for moving a square hole portion 301a of the slide guide 301.

There are two of the reference pins 303 and two of the reference pins 304. The reference pins 303 are provided on a side wall of the slide guide 301 and are made of metal. The reference pins 304 are provided on a side wall of the slide guide 302 and are made of metal. To align a sheet, the slide guide 302 moves as has been described to bring the reference pins 304 and 303 into contact with a left edge Sd and a right edge Sc of the sheet, respectively.

The slide guide 301 and the slide guide 302 are supported in a height direction by the stepped gear 317 and the jog sheet metal frame G1. The reference pins 303 and 304 are not limited to metal pins, and forming reference pins and the slide guides 301 and 302 unitarily with one another by molding is a less expensive option.

(Operation of the Slide Guides)

Described next is operations of the slide guides 301 and 302.

As the sheet post-processing device 300 is turned on, the stapler roller pair 320 starts to rotate and then the jogger motor M is rotated to rotate the stepped gear 317. This brings the slide rack 310 to the left side of FIGS. 5A and 5B and the slide rack 312 to the right side. The migration of the slide rack 310 causes the slide guide 302, which is integrated with the slide rack 310, to move to the left side of FIGS. 5A and 5B and retract outward. The rightward motion of the slide rack 312 brings the embossing portion 312a of the slide rack 312 into contact with the right edge of the square hole portion 301a of the slide guide 301, thereby making the slide guide 301 retract outward.

Figure 6B:
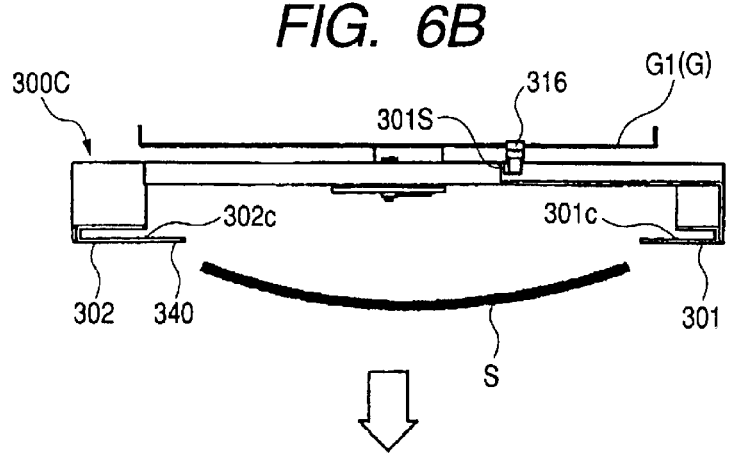

The slide guide 301 has a slit portion 301S as shown in FIG. 5B. When the slit portion 301S is moved by a given retraction distance, light is transmitted through a photo sensor 316 as shown in FIG. 6B and the jogger motor M is stopped at this point. This position is hereinafter referred to as home position.

On the other hand, when a signal indicating that the sheet S is about to enter the sheet post-processing device 300 is inputted from the printer main body 100A, the jogger motor M is rotated to move the slide guides 301 and 302 inward (to cause the slide guides approach each other) until the gap between the slide guides becomes wider than the width of the advancing sheet S by a given amount D as shown in FIG. 5B. At this position, an elongated hole 301d of the slide guide 301 comes into contact with one of the guide pins 313a and prevents further inward movement of the slide guide 301. This position is hereinafter referred to as standby position. At this standby position, the side face of the slide guide 301 serves as the reference point in the alignment operation.

In this embodiment, the standby position is set for the slide guides 301 and 302 such that the gap between the sheet S and the slide guide 301 and the gap between the sheet S and the slide guide 302 are each equal to or larger than a given amount D when the sheet S has the largest size (width) that can be accepted by the sheet post-processing device 300.

When a sheet having a narrower width than the maximum is to be aligned, the slide guide 302 is moved accordingly to the right side and the left side gap in the standby position shown in FIGS. 5A and 5B is thus kept to the given amount D. On the other hand, the gap between the sheet and the slide guide 301 in this case is larger than the given amount D by half an amount of the width difference between the narrower sheet and the widest sheet.

Figure 12A:
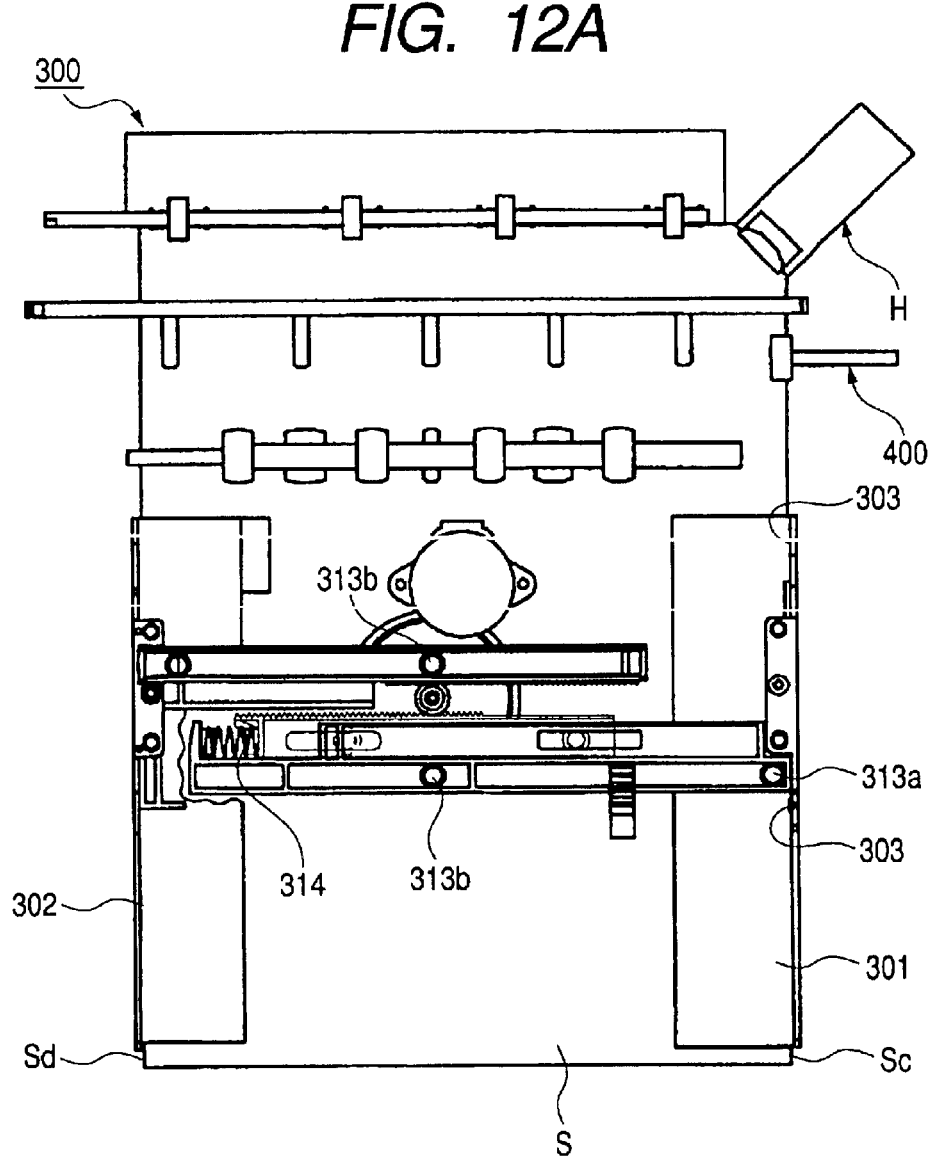
FIGS. 12A and 12B are diagrams showing the sheet post-processing device of Embodiment 1 with a sheet positioned at a given position, FIG. 12A showing a plan view of the sheet post-processing device, FIG. 12B showing FIG. 12A viewed from the near side.
Figure 12B:
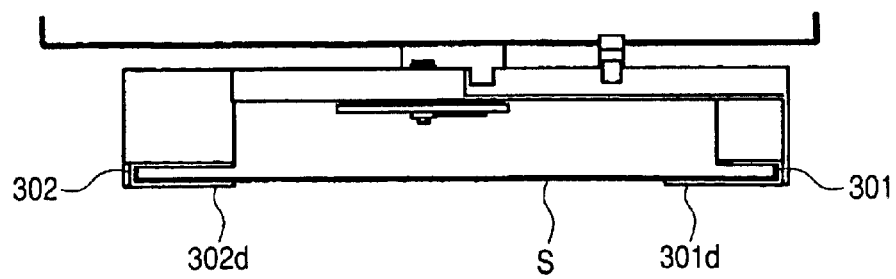

After finishing sheet alignment in the width direction, the slide guides 301 and 302 are slightly retracted outward from the positions shown in FIGS. 12A and 12B. This loosens the regulation over the sheet S in the alignment direction and allows the sheet S to move in the sheet conveying direction.

Thereafter, as shown in FIG. 10, the paddles 322 make one clockwise turn about the paddle shaft 350 while keeping a contact with the top face of the sheet S. The sheet is thus pushed against the reference wall 323 to make the upstream end of the sheet flush with the reference wall 323.

Figure 13A:
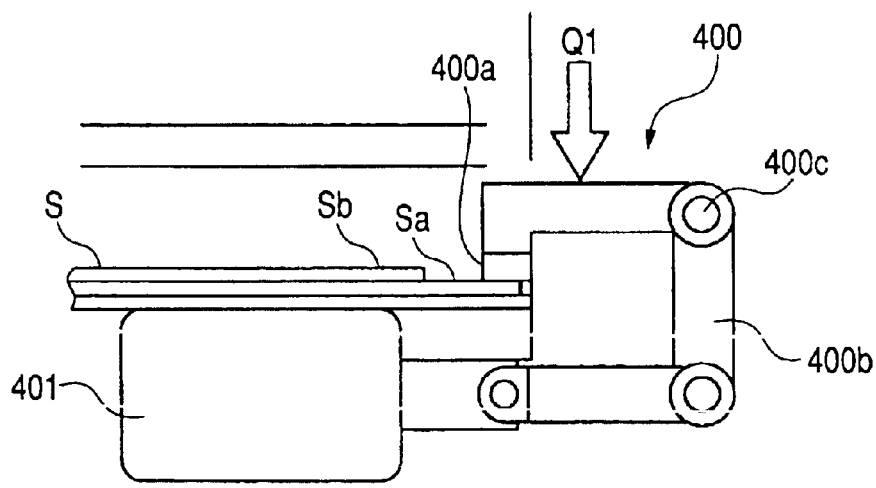
FIGS. 13A and 13B are diagrams of a sheet hold-down mechanism viewed from the sheet conveying direction in the sheet post-processing device of Embodiment 1, FIG. 13A showing a state in which a sheet is held down, FIG. 13B showing the sheet hold-down mechanism unlocked.
Figure 13B:
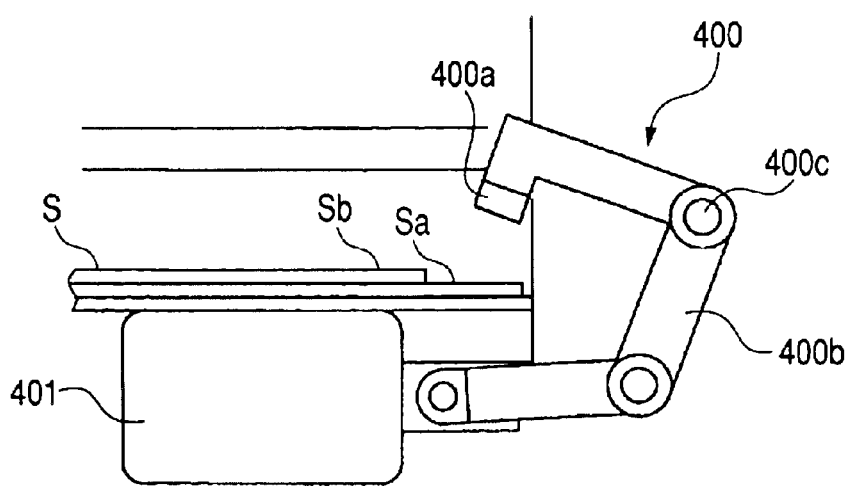

Through the above-described actions of the slide guides 301 and 302 and the paddles 322, the sheet is now aligned at the left and right edges and at the front and rear ends in the sheet conveying direction. In order to keep the sheet in this aligned state, a sheet hold-down mechanism 400 is provided as shown in FIGS. 13A and 13B in the vicinity of the right edge of the sheet aligned as shown in FIGS. 12A and 12B.

The sheet hold-down mechanism 400 presses down on the aligned sheet S by moving a lever 400b, which has a friction member 400a, up and down. To elaborate, the sheet hold-down mechanism 400 presses down on the top face of a sheet that has been aligned by the actions of the slide guides 301 and 302 and the paddles 322 before a sheet that enters next comes into contact with the previously aligned sheet after the alignment operation is finished. In this way, the next sheet is prevented from moving and disturbing the previously aligned sheet.

Alignment of the first sheet is thus completed. Thereafter, the second sheet and subsequent sheets are conveyed. In conveying the second sheet or any sheet following the second sheet, the rollers of the delivery roller pair 330 are spaced apart from each other. Therefore, as the rear end of a sheet S completely leaves the staple roller pair 320, the weight of the sheet itself causes the sheet to travel in the direction opposite to the conveying direction and to move in the direction of the reference wall 323 until the sheet is stopped by the reference wall 323. The subsequent alignment operation is exactly the same as the alignment operation for the first sheet, and therefore the description is omitted.

The sheet post-processing device 300 repeats such operation until the last (n-th) sheet (Sn) of one job is aligned.

Then, with the reference pins 304 of the slide guide 302 pressing the right edges of the sheets against the reference pins 303 of the slide guide 301 to thereby stop the movement of the slide guide 302 as shown in FIGS. 12A and 12B, the sheet bundle is stapled in the right rear end by the stapler H, which is small in size and which is positioned to the right and at the rear end of the sheet bundle.

Structured and operated as above, the sheet post-processing device 300 of this embodiment can perform without fail an accurate binding process by the stapler H placed and fixed on the side of the slide guide 301 since, during the sheet alignment operation, the slide guide 301 stands still at the reference position whereas the slide guide 302 alone is moved to align the right (in FIGS. 12A and 12B) edge of each sheet at the reference position.

When the stapling operation is finished in this manner, the arm 330c is rotated clockwise to move the upper delivery roller 330a, which is axially supported by the arm 330c, downward as shown in FIG. 11. This causes the upper delivery roller 330a to press the sheets against the lower delivery roller 330b and, at the same time, the upper delivery roller 330a is driven to start the rotating motion of the upper delivery roller 330a and the lower delivery roller 330b. The bundle of sheets S, S, . . . is thus held between the rollers of the delivery roller pair 330 and conveyed onto the downstream side intermediate stacking unit 300C composed of the slide guides 301 and 302.

Prior to the start of the conveyance of the bundle of sheets S, S, . . . by the delivery roller pair 330 (how long is predetermined), the jogger motor M is rotated to move the slide guide 302 at the position shown in FIGS. 12A and 12B away from the slide guide 301, widening a gap between the slide guides 301 and 302.

As the slide guide 302 starts this movement, the slide guide 301 does not immediately start to move even though the slide rack 312 is moved to the right side of FIGS. 12A and 12B since the slide guide 301 is pushed to the left side of FIGS. 12A and 12B by the spring 314, which is interposed between the slide rack 312 and the slide guide 301. The slide guide 301 starts movement toward the right side of FIGS. 5A and 5B together with the slide rack 312 only after the slide guide 302 passes the standby position shown in FIGS. 5A and 5B and the embossing portion 312a of the slide rack 312 is brought into contact with the right (in FIGS. 12A and 12B) edge of the square hole portion 301a of the slide guide 301. As a result, the slide guides 301 and 302 are both moved.

Figure 15:
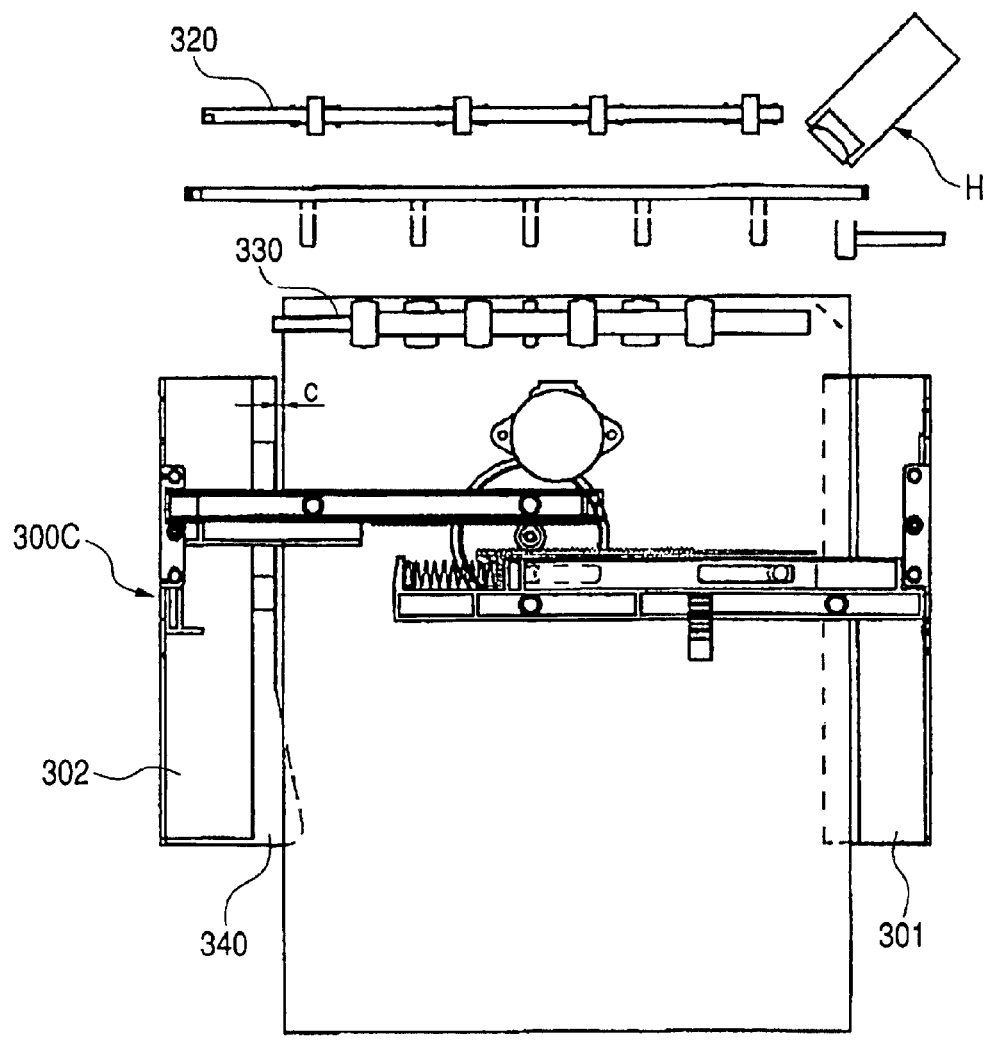
FIG. 15 is a plan view of the downstream side intermediate stacking unit in the sheet post-processing device of Embodiment 1 with the slide guides being opened in preparation for letting a processed sheet drop to the sheet stacking tray.

FIG. 15 is a plan view of the downstream side intermediate stacking unit 300C with the slide guides 301 and 302 being opened before the bundle of sheets S, S, . . . is let drop onto the sheet stacking tray 325. In this state, the bundle of sheets S, S, . . . is already partially distanced from the slide guide 302 by a distance c but is supported by the approximately triangular sheet holding portion 340 of the slide guide 302. The bundle of sheets S, S, . . . is also nipped in the rear end by the delivery roller pair 330 as described above, and therefore is kept held to the second intermediate stacking unit 300C without falling onto the tray.

As the left and right slide guides 301 and 302 are opened further, the downstream side portions of the left and right slide guides 301 and 302 release the bundle of sheets S, S, . . . approximately at the same time as shown in FIGS. 6A and 6B. The sheet bundle is dropped as a result and lands on the sheet stacking unit 325 as shown in FIG. 11. However, a side is cut off and this makes the fall of the sheet bundle unbalanced between left and right. The sheet bundle is prevented from making an unbalanced fall on the upstream side by keeping a few mm of the rear end of the sheet bundle nipped by the delivery roller pair 330 just as the gap between the slide guides 301 and 302 becomes wider than the paper width.

The structure and operations have been described for the printer main body and sheet post-processing device of this embodiment.

The sheet post-processing device 300 of this embodiment has the approximately triangular sheet holding portion 340 provided in the slide guide 302. Reasons for providing the sheet holding portion 340 are given below with reference to FIGS. 16 and 20.

Figure 16:
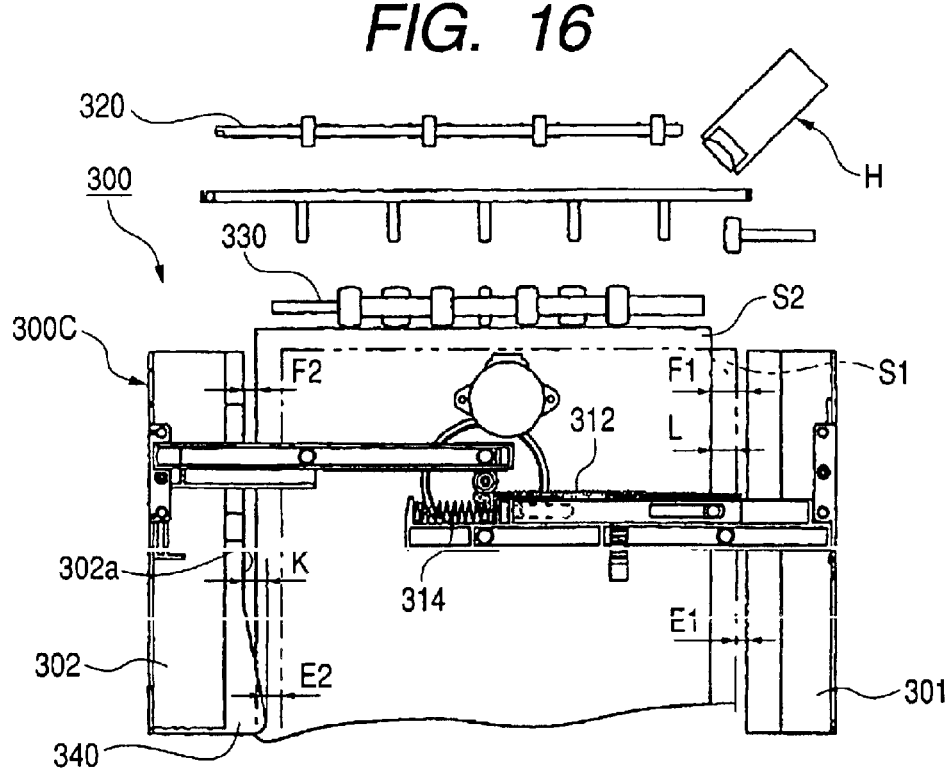
FIG. 16 is a plan view of the sheet post-processing device of Embodiment 1.

FIG. 16 is a plan view of the downstream side intermediate stacking unit 300C according to Embodiment 1 of the present invention. In FIG. 16, reference symbol S1 denotes a bundle of sheets indicated by the broken line and reference symbol S2 denotes a single sheet indicated by the solid line.

In this embodiment, when the slide guides 301 and 302 are at the positions for discharging the sheet bundle S1, there are gaps E1 and E2 from the sheet bundle S1 to the slide guides 301 and 302 as shown in FIG. 16. If the single sheet S2 is to be delivered in this state, there are gaps F1 and F2 from the single sheet S2 to the slide guides 301 and 302.

The gaps E1, E2, F1, and F2 are different from one another. The reason is given below. A sheet is conveyed as the single sheet S2 to the downstream side intermediate stacking unit 300C, centered side-to-side on the conveying path, with the image formation side facing downward. If one single sheet and another single sheet conveyed are to be bound together, the sheets have to be aligned in width by the slide guides 301 and 302 and then bound with the stapler H. The stapler H is fixed in order to lower the cost of the sheet post-processing device 300. In addition, the stapler H is positioned on the side of the slide guide 301 so that the stapler H in its opened state does not hinder the advance of the sheets. The stapler H is placed on the side of the slide guide 301 to staple the upper left corner of the sheet bundle. The sheet bundle S1 shown in FIG. 16 is reversed with the image formation side facing downward, and accordingly the stapler H is fixed on the side of the slide guide 301.

The sheet bundle on the slide guides 301 and 302 has to be aligned in width by the slide guides 301 and 302 before being moved toward the stapler H. To achieve this, the shared jogger motor M prompts the slide guides 301 and in FIG. 16 to narrow the gap between the two slide guides until the slide guide 301 is stopped at a given position. This state corresponds to the standby state shown in FIGS. 5A and 5B.

At this point, a single sheet is conveyed into the aligning members. Gaps between the side edges of the conveyed sheet and the pins 303 and 304 of the slide guides 301 and 302 are each equal to D or larger. Since the sheet has not come into contact with the pins 303 and 304 of the slide guides 301 and 302 yet, the sheet has not been moved (the standby position). Note that D varies between the left gap and the right gap.

Thereafter, the left slide guide 302 alone is moved to push the sheet against the right slide guide 301 as shown in FIGS. 12A and 12B, thereby aligning the sheet (an alignment position). The spring 314 is necessary for moving the left side slide guide 302 while keeping the right side slide guide 301 still. The slide guide 302 pushes the sheet bundle against the slide guide 301 to align the sheet bundle in width using the slide guide 301 as the reference. The slide guide 302 is moved for the alignment for about 20 mm. Accordingly, the sheet bundle is offset from the single sheet by the distance L to the right in FIG. 16. The sheet bundle is then bound. The slide guide 301 can be stopped despite the slide guide 302 continuing to move because the movement of the slide rack 312 affects only to compress the spring 314 as far as a point where the slide rack 312 and the spring 314 are balanced and it is not until past the balance point that the slide guide 301 and the slide rack 312 start to move as one.

The spring 314 is provided to allow the slide guide 301 and the slide rack 312, which are separate members in order to enable the slide guide 302 to continue to move after the slide guide 301 is stopped, to move in conjunction with each other. If the spring 314 is omitted and the slide guide 301 and the slide rack 312 are not separate members but one, the slide guide 302 cannot move further after the slide guide 301 is stopped upon contact with the guide pins 313a (see FIG. 5A). On the other hand, without the spring 314, there is nothing else that allows the slide rack 312 and the slide guide 301 to move in conjunction with each other and therefore movement of the slide rack 312 is an independent motion that does not cause the slide guide 301 to move. To avoid such situations, the spring 314 is interposed between the slide guide 301 and the slide rack 312.

To discharge the sheet bundle, the jogger motor M is rotated reverse to move the slide guides 301 and 302 away from each other. As shown in FIGS. 12A and 12B, in starting the movement from the alignment position, the slide guide 301 is kept still until the standby position, which is shown in FIGS. 5A and 5B and at which the compressed spring 314 is released by its resilience, is reached. After the standby position shown in FIGS. 5A and 5B is reached and the slide guide 301 is moved slightly outward (1 mm or more, to be specific) from the standby position, the slide guides 301 and 302 retract outward at a constant speed. The slide guides 301 and 302 move away from each other approximately at the same time. Upon finishing the retraction movement, the slide guides 301 and 302 arrive at retraction positions shown in FIG. 16.

As described above, the position of the single sheet S2 and the position of the sheet bundle S1 are offset from each other by the distance L as shown in FIG. 16. Thus, the gap F1 between the right edge of the single sheet S2 and the slide guide 301 is wider than the gap F2 between the left edge of the single sheet S2 and the slide guide 302 (F1>F2). The gap E2 and the gap F2 are approximately equal to each other (E2≈F2). The gap E1 and the gap E2 are also approximately equal to each other (E1≈E2).

Based on the above relation between the gaps, attention should be focused on the gaps E2 and F2 from the left slide guide 302 to the left edges of the sheet bundle S1 and the single sheet S2 in order to discharge the sheet bundle and the single sheet correctly.

Figure 20:
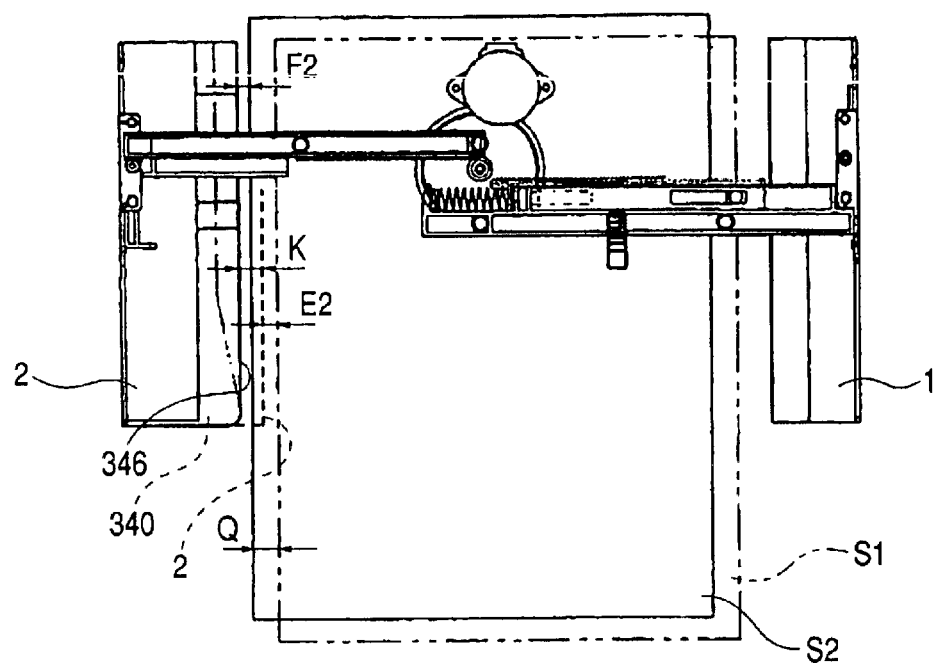
FIG. 20 is a plan view of a conventional sheet post-processing device.

This is explained in comparison to a conventional intermediate stacking unit shown in FIG. 20. An inner edge 346 of a slide guide 2 shown in FIG. 20 has no sheet holding portion 340 unlike the slide guide 302 of this embodiment and therefore has a liner shape in general. With the slide guide 2 of the conventional intermediate stacking unit as well, similarly to the downstream stacking unit 300C of this embodiment, the sheet bundle S1 can be discharged when the gap between the left edge of the sheet bundle S1 and the slide guide 2 is set to E2. The stop position (indicated by the broken line) of the slide guide 2 at this time corresponds to the stop position of the slide guide 302 of this embodiment.

However, it is impossible for the conventional intermediate stacking unit to discharge the single sheet S2 with the slide guide 2 set in the position for discharging the sheet bundle S1, because the slide guide 2 interferes with the single sheet S2. In order to obtain the same gap as the gap F2 between the single sheet S2 and the slide guide 302 of this embodiment, the conventional intermediate stacking unit has to move the slide guide 2 leftward by a distance K from the position for discharging the sheet bundle S1. The leftward movement of the slide guide 2 by the distance K causes a slide guide 1, which is structured so as to move in conjunction with the slide guide 2, to also travel by the distance K to the right.

In contrast, the slide guide 302 of this embodiment has its right edge 302a placed to the left from the nose of the sheet holding portion 340 by the distance K. This makes it possible for the intermediate stacking unit of this embodiment to discharge a single sheet with the slide guide 302 set in the same position as the position for discharging a bundle of sheets (in other words, a bundle of sheets can be discharged with the slide guide 302 set in the position for discharging a single sheet). The same applies to the slide guide 301 and the intermediate stacking unit of this embodiment can discharge a single sheet with the slide guide 301 set in the same position as the position for discharging a bundle of sheets.

When the gaps E2 and F2 satisfy E2≈F2, the distance K is equal to the distance L, by which the sheet bundle is offset to the right of the single sheet in FIG. 16. Accordingly, the slide guide 302 of this embodiment has a configuration such as obtained by cutting off a portion of one slide guide 302 which is on the upstream side in the sheet conveying direction by the same distance as the offset distance of the sheet bundle from the single sheet (K=L).

As described above, the downstream side intermediate stacking unit 300C in the sheet post-processing device of this embodiment is capable of discharging a single sheet and a bundle of sheets with the slide guides 301 and 302 always set in the same retraction positions irrespective of whether a single sheet or a sheet bundle is to be discharged, by simply cutting off an upstream side portion of the slide guide 302 by the same distance as the offset distance of a sheet bundle from a single sheet. In addition, the gap E2 and the gap F2 are approximately equal to each other (E2≈F2) and therefore the downstream side intermediate stacking unit 300C of this embodiment has the characteristics given below.

That is, to open the slide guides and discharge a sheet bundle that has been bound, the slide guide 302 only has to travel by the minimum distance actually required to discharge the sheet bundle, that is, by a distance shorter than in the prior art. The excess waste of motion of the slide guide is thus eliminated and the sheet processing efficiency is enhanced. In addition, each slide guide travels a shorter distance to discharge a single sheet than in prior art. Specifically, the amount of movement of each slide guide is reduced by an offset distance of a sheet bundle from a single sheet. The reduction in amount of movement of the slide guides shortens the sheet delivery time, thereby raising the sheet delivery efficiency. Another advantage of reducing the amount of movement of each slide guide is that the sheet post-processing device can have a smaller size. Moreover, wear of the device is reduced and the device can have a longer life by making the slide guides travel shorter distances.

The downstream side intermediate stacking unit 300C is also capable of dropping a sheet bundle flat to land in the same position since the gap E1 and the gap E2 are approximately equal to each other (E1≈E2) and thus the slide guides 301 and 302 are released from the left and right edges of the sheet bundle approximately at the same time. This means that a bundle of sheets can land on the sheet stacking unit without disturbing the neatness of the bundle.

The downstream side intermediate stacking unit 300C in the sheet post-processing device of this embodiment sets the gaps to satisfy E1≈E2 in accordance with the size of sheets the device handles most frequently, but E1≈E2 is not always met when a sheet of a different size is processed. However, the device has no trouble in dealing with a sheet of a different size because the retraction speed of the slide guides 301 and 302 is set faster than in prior art, at about 200 mm/s. As a result, when a bundle of A4 (297 mm×210 mm) sheets and a bundle of LTR (279.4 mm×215.9 mm) sheets which have a sheet width difference of about 6 mm are dropped onto the stacking tray unit 325 (see FIG. 1), the drop error between the two is only about 30 ms. Thus a sheet bundle can land neatly on the stacking tray unit 325 irrespective of sheet size.

On the other hand, in a downstream side intermediate stacking unit 600C of a sheet post-processing device 600 according to a third embodiment of the present invention, which is described later, the gap relation E1≈E2 can be maintained by adjusting the gaps each time the sheet size is changed.

The above-described sheet hold-down mechanism 400, which serves as the misalignment preventive means shown in FIGS. 13A and 13B, has the friction member 400a, the arm lever 400b, the solenoid 401, and a not-shown helical torsion spring. The friction member 400a is provided at the tip of the sheet hold-down mechanism. The arm lever 400b is a depressing member that can rotate with an axis 400c as the fulcrum. The solenoid 401 serves as unlocking means for pulling the arm lever 400b out of its depression operation by rotating the arm lever 400b. The helical torsion spring biases the arm lever 400b in the direction indicated by an arrow Q1 to push the sheets S, S, . . . in the direction of the right slide guide 301 (see FIGS. 12A and 12B).

During the sheet delivery operation, the arm lever 400b of the sheet hold-down mechanism 400 presses, with the force of the helical torsion spring, down on a preceding, aligned sheet Sa from the outside of the sheet conveying path along which a following sheet Sb is conveyed as shown in FIGS. 13A and 13B, in other words, from the outside of the sheet passage range.

This prevents the arm lever 400b from interfering with the following sheet Sb, which is to be discharged next, and, at the same time, prevents the following sheet Sb from pushing out the preceding sheet Sa that has been held in an aligned state in the downstream side intermediate stacking unit 300C.

Figure 14A:
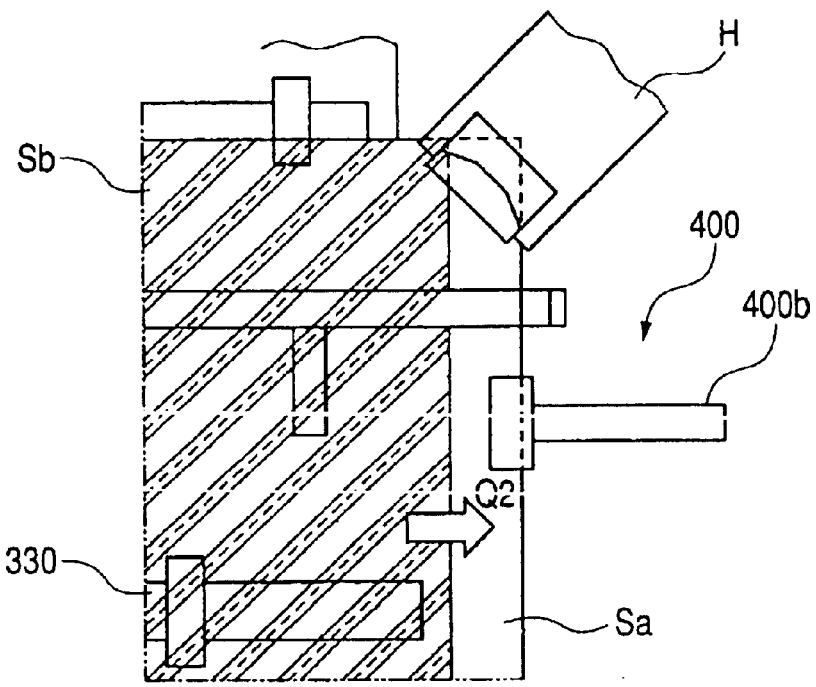
FIGS. 14A and 14B are diagrams of the sheet hold-down mechanism in the sheet post-processing device of Embodiment 1, FIG. 14A showing an enlarged view of the sheet hold-down mechanism, FIG. 14B showing the mechanism unlocked and viewed from the sheet conveying direction.
Figure 14B:
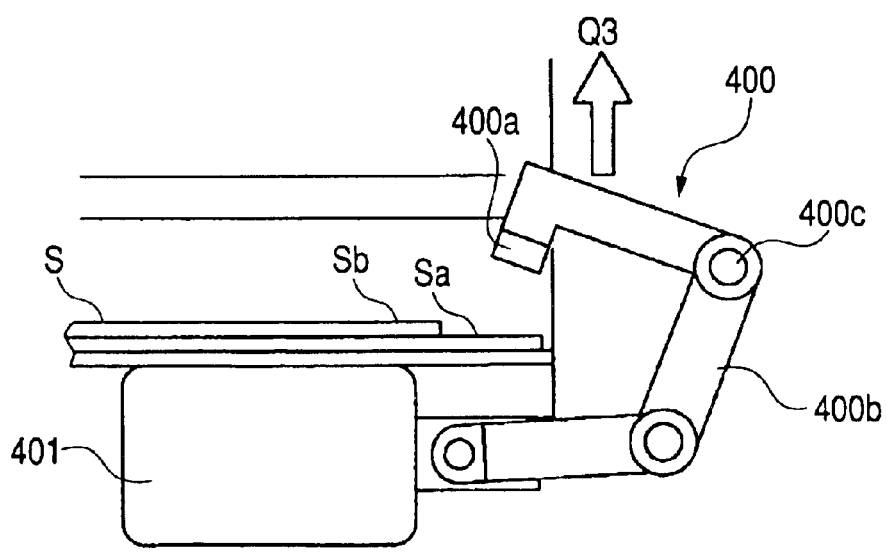

When the following sheet Sb is discharged completely, the above-described movement of the left slide guide 302 (see FIGS. 12A and 12B) causes the following sheet Sb to move in the direction of an arrow Q2 shown in FIG. 14A. During this movement of the following sheet Sb, the solenoid 401 is turned on to rotate the arm lever 400b in the direction indicated by an arrow Q3 shown in FIG. 14B. As a result, the following sheet Sb slips under the arm lever 400B.

Thereafter, the paddles 322 shown in FIG. 1 align the sheets in the sheet conveying direction and then the slide guide 302 returns to the standby position. Before the slide guide 302 returns to the standby position to complete the preparations for loading the next sheet, the solenoid 401 is turned off in the sheet post-processing device 300 of this embodiment. This allows the arm lever 400b to again press down on the preceding sheet Sa and thus the preceding sheet Sa is pushed out by the following sheet Sb.

Embodiment 2

Figure 17:
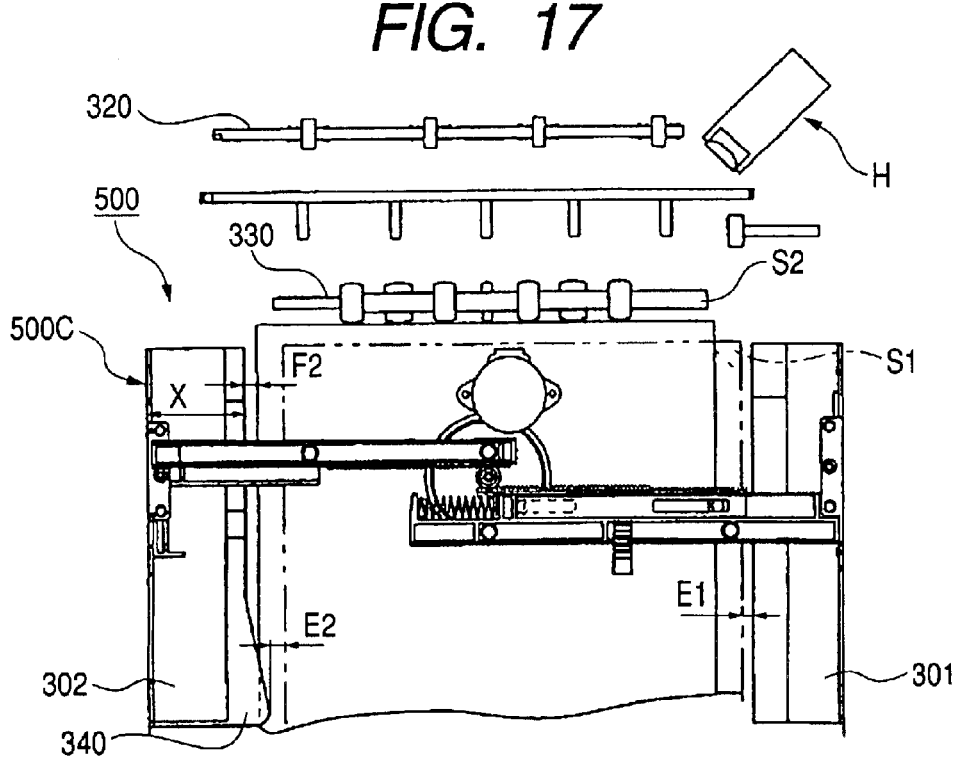
FIG. 17 is a plan view of the sheet post-processing device of Embodiment 1.
Figure 18:
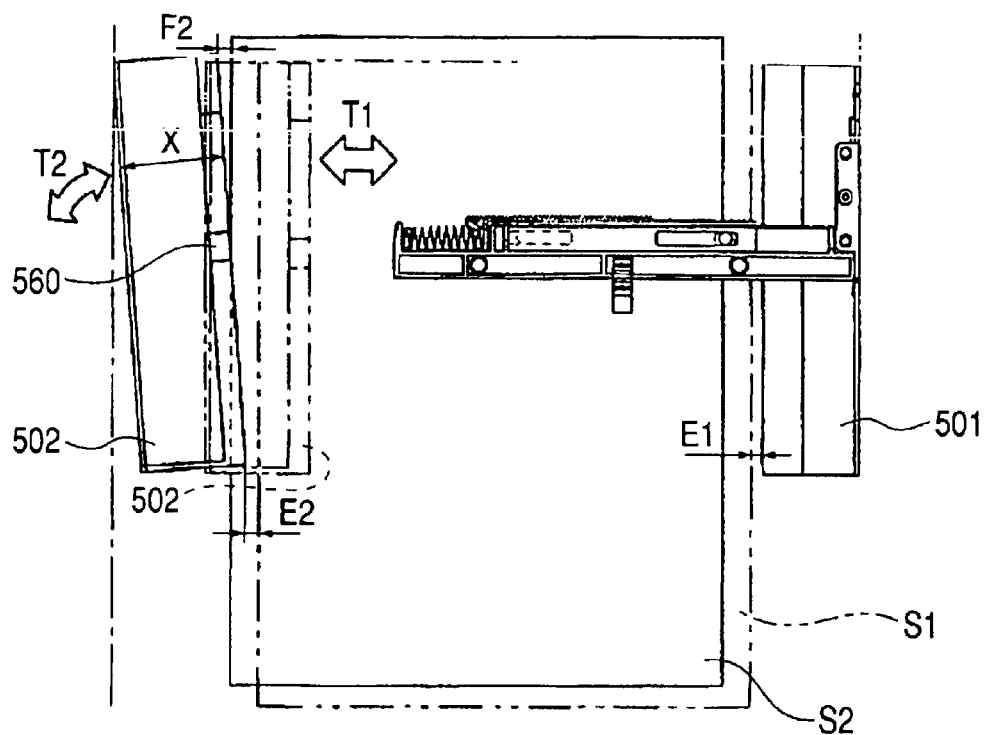
FIG. 18 is a plan view of a sheet post-processing device according to Embodiment 2.

A description is given with reference to FIG. 18 on a downstream side intermediate stacking unit of a sheet post-processing device 500 according to Embodiment 2 of the present invention. The intermediate stacking means of Embodiment 2 is, for example, a downstream side intermediate stacking unit 500C shown in FIG. 18. The downstream side intermediate stacking unit 500C of Embodiment 2 is compared with the downstream side intermediate stacking unit 300C of Embodiment 1 which is shown in FIG. 17.

In FIGS. 17 and 18, a bundle of sheets S1 is indicated by a broken line and a single sheet S2 is indicated by a solid line. A slide guide 501 makes a similar movement as the slide guide 301 of Embodiment 1. During the alignment process (during a reciprocating motion to and from a position indicated by a dot-dot-dash line), a slide guide 502 makes, similar to the slide guide 302 of Embodiment 1, a parallel motion in the direction orthogonal to the sheet conveying direction as indicated by an arrow T1. However, upon nearing a retraction position, the slide guide 502 is guided by a not-shown rail and the upstream end of the slide guide 502 is turned in the direction indicated by an arrow T2. The slide guide 502 thus obtains an oblique retraction state as indicated by the solid line.

The slide guide 502 of Embodiment 2 is shaped like a slip and has a width X, which is equal to the width of the upstream side portion of the slide guide 302 of Embodiment 1. Accordingly, the slide guide 502 of Embodiment 2 does not have a portion corresponding to the sheet holding portion 340 of the slide guide 302 of Embodiment 1. When the slide guides 501 and 502 are retracted, the width of the opening between the slide guides 501 and 502 is narrower on the downstream side with respect to the sheet conveying direction than on the upstream side. Furthermore, when a bundle of sheets S, S, . . . is to be dropped, the gap between a holding face of the slide guide 502 and the left edge of the bundle of sheets S, S, . . . and the gap between a holding face of the slide guide 501 and the right edge of the bundle of sheets S, S, . . . are set approximately equal to each other (E1≈E2). Therefore, the downstream side intermediate stacking unit of this embodiment can drop and land a bundle of sheets stably as in Embodiment 1. In FIGS. 17 and 18, F2 denotes a gap between the single sheet S2 and the slide guide 302 or 502.

In discharging the single sheet S2, the slide guide 502 tilted in the retraction position appears to interfere with the single sheet S2. However, the portion that looks like interfering with the sheet has its downstream in the sheet conveying direction of bent portions 560 of the slide guides 501 and 502 (the bent portion of the slide guide 501 is omitted from the drawing) and is inclined upward, similarly to the bent portion 300D of Embodiment 1. In this way, the slide guides 501 and 502 are prevented from interfering with a falling single sheet.

In addition to the characteristics of the downstream side intermediate stacking unit 300C in the sheet post-processing device 300 of Embodiment 1, the downstream side intermediate stacking unit 500C in the sheet post-processing device 500 of Embodiment 2 has the following characteristics:

The downstream side intermediate stacking unit 500C has a sophisticated design since the sheet holding portion 340 of the downstream side intermediate stacking unit 300C in Embodiment 1 is omitted. The tilted slide guide 502 helps to reduce the sheet post-processing device in size.

The downstream side intermediate stacking unit 500C of this embodiment sets the gaps to satisfy E1≈E2 in accordance with the size of sheets the device handles most frequently, similar to the downstream side intermediate stacking unit 300C of Embodiment 1. However, E1≈E2 is not always met when a sheet of a different size is processed.

This embodiment deals with a sheet of a different size by setting the retraction speed of the slide guides 501 and 502 faster than in prior art, at about 200 mm/s.

Embodiment 3

Figure 19:
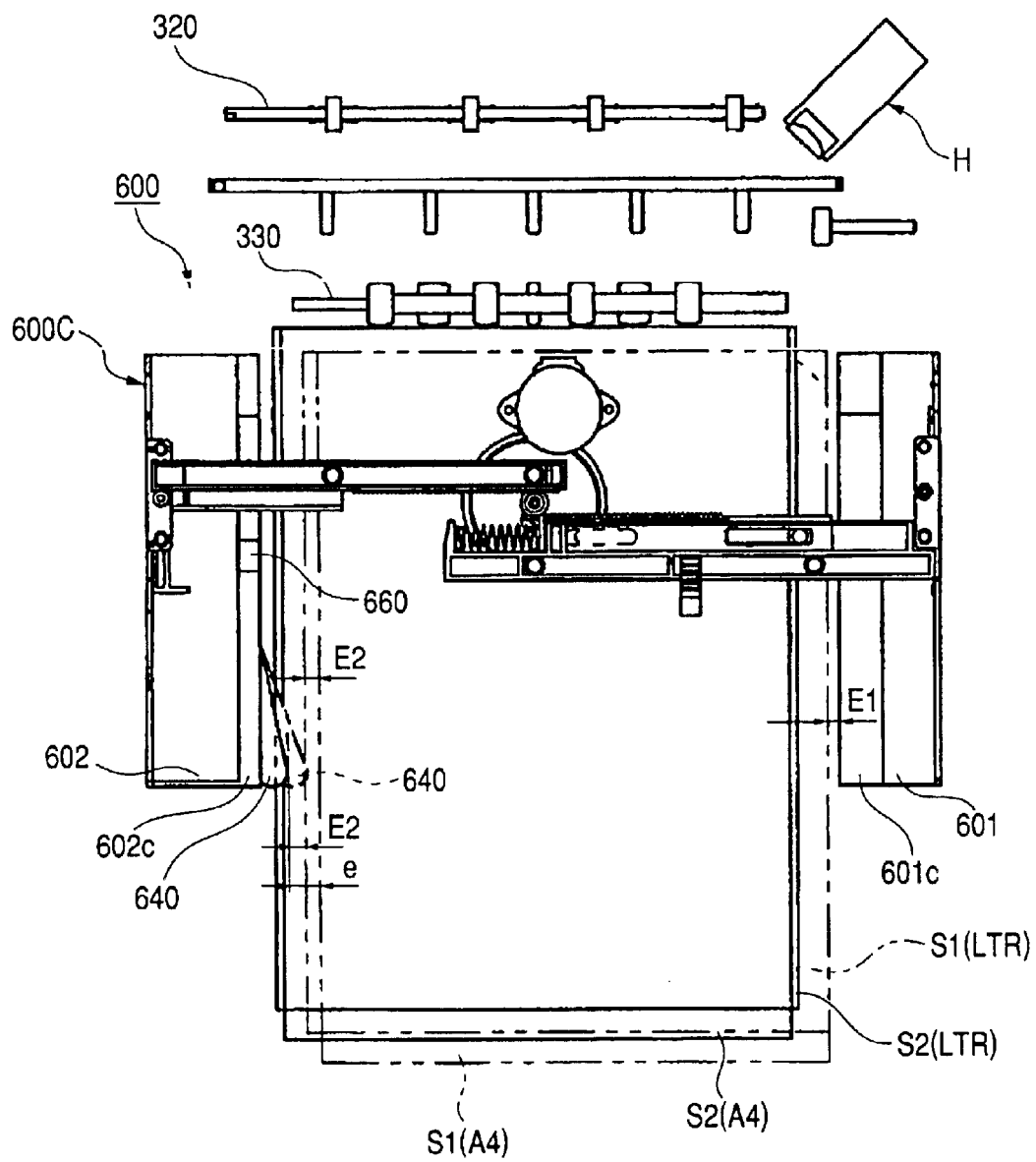
FIG. 19 is a plan view of a sheet post-processing device according to Embodiment 3.

A description is given with reference to FIG. 19 on the downstream side intermediate stacking unit 600C of the sheet post-processing device 600 according to Embodiment 3 of the present invention. In FIG. 19, a bundle of sheets S1 is indicated by a broken line and a single sheet S2 is indicated by a solid line. The downstream side intermediate stacking unit 600C is an example of intermediate stacking means of this embodiment. The downstream side intermediate stacking unit 600C has slide guides 601 and 602. A support portion of the left slide guide 602, for example, a bottom piece 602c, is partially cut off. The remaining portion of the slide guide 602, for example, a sheet holding portion 640, is on the downstream side in the sheet conveying direction. The downstream side intermediate stacking unit 600C is different from the downstream side intermediate stacking units 300C and 400C of Embodiments 1 and 2 in that, when the slide guides 601 and 602 are retracted, a user can adjust the position of the sheet holding portion 640 to suit the sheet size.

In the downstream side intermediate stacking unit 300C of Embodiment 1, the retraction speed of the slide guides is set fast in order to let a sheet fall balanced when the sheet is of a different size and the gap relation, E1≈E2, is not met. On the other hand, in the downstream side intermediate stacking unit 600C of this embodiment, the position of the sheet holding portion 640, which corresponds to the sheet holding portion 340 of the downstream side intermediate stacking unit 300C in Embodiment 1, can be adjusted so that the gap relation E1≈E2 is maintained through a change in sheet size. The need to set the retraction speed of the slide guides fast is thus eliminated (not that this takes setting the retraction speed fast in discharging and dropping a sheet out of option).

When the slide guides 601 and 602 of the downstream side intermediate stacking unit 600C of this embodiment are retracted to drop an aligned bundle of sheets of LTR size (279.4 mm×215.9 mm) which is denoted by S1(LTR) in FIG. 19, the gap E1 between the sheet bundle S1 and the bottom piece 601c, which is an example of the support portion of the slide guide 601, and the gap E2 between the sheet S2 and the sheet holding portion 640 are set approximately equal to each other (E1≈E2). Therefore, the sheet bundle leaves the slide guides evenly and drops stably. However, when a bundle of sheets of A4 size (297 mm×210 mm) is to be dropped, a gap e between the sheet holding portion 640 and the sheet bundle S1(A4) is wider than the above gap E2, failing to satisfy e≈E1. This makes the fall of the bundle of A4 sheets unbalanced and the neatness of the sheet bundle could be disturbed when landed on the stacking tray unit 325 (see FIG. 1).

The downstream side intermediate stacking unit 600C of this embodiment deals with this by changing the position of the sheet holding portion 640 such that the gap e becomes equal to E2. The slide guide 602 has a mark for each sheet size, enabling a user to change the position of the sheet holding portion 640 and setting the gap e equal to the gap E2 by choosing the mark for size A4 and following the mark. A bundle of A4 sheets thus can be dropped evenly as for a bundle of LTR sheets.

In this way, the downstream side intermediate stacking unit 600C of this embodiment changes the position of the sheet holding portion 640 in accordance with the sheet size to set the gap e equal to the gap E2 (≈E1). Therefore a bundle of sheets can be dropped evenly onto the stacking tray unit 325 (see FIG. 1) without disturbing the neatness of the bundle irrespective of sheet size.

As in Embodiment 1, the sheet holding portion 640 of the downstream side intermediate stacking unit 600C of this embodiment protrudes on the downstream side in the sheet conveying direction of a bent portion 660 of the left slide guide 602 as shown in the drawing. Therefore, when the single sheet S2 (LTR) and the single sheet S2 (A4) that do not receive post processing are to be discharged, the slide guide 602 does not interfere with the single sheets S2 (LTR) and S2 (A4).

As described, by changing how far the sheet holding portion 640 protrudes, a bound sheet bundle S1 and a separate, single sheet S2 can be dropped stably at low cost without making the slide guides retract farther and irrespective of sheet size (including A4, LTR, and other sizes).

The sheet holding portion may be automatically moved by not-shown driving means in accordance with the sheet size.

The description given above is about a case in which sheet post-processing is a binding process. However, this structure can provide a similar effect for a puncher which punches a hole in a sheet and for a sheet post-processing device which bundles sheets by pasting. Sheet post-processing of the sheet post-processing device is therefore not limited to a binding process. When sheet post-processing is a punching process, one sheet may be punched a hole instead of a bundle of sheets.

The pair of slide guides described above align a bundle of sheets and position the sheet bundle at a processing position as well. The slide guides also positions a single sheet at a processing position.

The pair of slide guides are moved in relation to each other by the shared jogger motor M. Alternatively, the slide guides may be operated by separate motors.

The bent portions 360, 560, and 660 are not always necessary. If the slide guides 301, 302, 501, 502, 601, and 602, which are support members, are directed upward above the convey nip line NL, a sheet that does not receive post processing is not caught on the sheet holding portion 340 and 640 and the downstream end portion of the tilted slide guide 502 and thus the sheet can be dropped securely from the gap between the pair of support members 301 and 302, or 501 and 502, or 601 and 602.

What is claimed is:

1. A sheet post-processing device, comprising:
a conveying roller which conveys a sheet;
an intermediate stacking tray which has a pair of support members for respectively supporting edges of the sheet conveyed by said conveying roller in a direction intersecting with a sheet conveying direction, wherein each of the support members has a support portion for supporting one of the edges of the sheet and the support members are capable of moving toward and away from each other in a direction intersecting with the sheet conveying direction so that the sheet is pressed against one of the support members that serves as a reference by the other support member to be positioned; and
a stacking tray which receives the sheet that is dropped through a gap created between inner edges, in the direction intersecting with the sheet conveying direction, of the support portions of the support members which are moved way from each other and are moved to respective retraction positions,
wherein the gap is narrower on a downstream side in the sheet conveying direction than on an upstream side in the sheet conveying direction, when the support members are moved to the retraction positions respectively.

2. A sheet post-processing device according to claim 1, wherein the support portion of the other support member is formed in a shape partially cut off on the upstream side in the sheet conveying direction, and thereby the gap between the inner edges of the support portions in the direction intersecting with the sheet conveying direction is narrowed on the downstream side in the sheet conveying direction.

3. A sheet post-processing device according to claim 2, wherein the support portion of the other support member on the downstream side in the sheet conveying direction is provided in the other support member so as to be movable toward and away from the one support member.

4. A sheet post-processing device according to claim 3, wherein the support portion of the other support member on the downstream side in the sheet conveying direction moves in accordance with the size of the sheet conveyed by the conveying roller.

5. A sheet post-processing device according to claim 2, wherein the support portion of the other support member on the downstream side in the sheet conveying direction is formed in a triangular shape.

6. A sheet post-processing device according to claim 1, wherein, when the pair of the support members is moved to the retraction positions respectively, the gap between the inner edges of the support portions in the direction intersecting with the sheet conveying direction is narrowed on the downstream side in the sheet conveying direction by tilting the other support member with respect to the one support member.

7. A sheet post-processing device according to claim 1, wherein, when the pair of the support members is moved to the retraction positions respectively, the difference in the gap between the inner edges of the support portions in the direction intersecting with the sheet conveying direction on the downstream side and the upstream side in the sheet conveying direction is set approximately equal to a distance that the sheet conveyed by the conveying roller travels until the sheet reaches the one support member that serves as the reference.

8. A sheet post-processing device according to claim 1, wherein the pair of support members positions the sheet by making parallel motions to approach each other.

9. A sheet post-processing device according to claim 1, wherein downstream side ends in the sheet conveying direction of the support portions of the pair of the support members are on a higher plane than upstream side ends of the support members.

10. A sheet post-processing device according to claim 1, wherein the support portions of the pair of the support members are bent in the middle in the sheet conveying direction in a manner that puts the downstream side ends of the support portions in the sheet conveying direction on a higher plane than the upstream side ends of the support portions in the sheet conveying direction.

11. An image forming apparatus, comprising:

an image formation unit for forming an image on a sheet; and a sheet post-processing device for processing the sheet on which the image is formed by the image forming unit, wherein the sheet post-processing device is a sheet post-processing device of any one of claims 1 through 10.

* * * * *

UNITED STATES PATENT AND TRADEMARK OFFICE
CERTIFICATE OF CORRECTION

PATENT NO. : 6,912,044 B2
DATED : June 28, 2005
INVENTOR(S) : Junichi Sekiyama et al.

It is certified that error appears in the above-identified patent and that said Letters Patent is hereby corrected as shown below:

Column 1,
Line 55, "let" should read -- lets --.

Column 3,
Line 64, "position" should read -- positions --.

Column 8,
Line 9, "10A." should read -- 100A. --.

Column 10,
Line 35, "angle a." should read -- angle $\alpha$. --.

Column 11,
Line 23, "slid" should read -- slide --.
Line 66, "guides" should read -- guides to --.

Column 13,
Line 64, "a side" should read -- a part of the slide guide 302 that is on the upstream side --.

Column 14,
Line 43, "301 and" should read -- 301 and 302 --.

Column 15,
Line 21, "rotated" should read -- rotated in --.

Column 20,
Line 25, "punched" should read -- punched with --.
Line 29, "positions" should read -- position --.
Line 56, "by" should read -- for --.

UNITED STATES PATENT AND TRADEMARK OFFICE
CERTIFICATE OF CORRECTION

PATENT NO.   : 6,912,044 B2
DATED        : June 28, 2005
INVENTOR(S)  : Junichi Sekiyama et al.

It is certified that error appears in the above-identified patent and that said Letters Patent is hereby corrected as shown below:

<u>Column 20 (cont'd),</u>
Line 61, "way" shoud read -- away --.

Signed and Sealed this

Eighth Day of November, 2005

JON W. DUDAS
*Director of the United States Patent and Trademark Office*